United States Patent
Akashi

(10) Patent No.: US 9,450,677 B2
(45) Date of Patent: Sep. 20, 2016

(54) OPTICAL TRANSMITTER AND CONTROL APPARATUS OF OPTICAL MODULATOR

(71) Applicant: FUJITSU OPTICAL COMPONENTS LIMITED, Kawasaki-shi, Kanagawa (JP)

(72) Inventor: Tamotsu Akashi, Atsugi (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/575,020

(22) Filed: Dec. 18, 2014

(65) Prior Publication Data

US 2015/0188639 A1    Jul. 2, 2015

(30) Foreign Application Priority Data

Dec. 26, 2013    (JP) .................................. 2013-269649

(51) Int. Cl.
   *H04B 10/50*    (2013.01)
   *H04B 10/40*    (2013.01)
(52) U.S. Cl.
   CPC .......... *H04B 10/50575* (2013.01); *H04B 10/40* (2013.01)
(58) Field of Classification Search
   CPC ............ H04B 10/505–10/50597; H04B 10/50
   See application file for complete search history.

(56) References Cited

U.S. PATENT DOCUMENTS

| 2008/0080872 A1 | 4/2008 | Tanaka et al. |
| 2009/0003840 A1* | 1/2009 | Nahapetian ...... H04B 10/50575 398/183 |
| 2014/0334829 A1* | 11/2014 | Akiyama .............. G02F 1/0123 398/186 |

FOREIGN PATENT DOCUMENTS

| JP | 2008-92172 | 4/2008 |
| JP | 2013-88702 | 5/2013 |
| JP | 2013-110620 | 6/2013 |
| WO | WO 2013114628 A1 * | 8/2013 ........... G02F 1/0123 |

* cited by examiner

*Primary Examiner* — David Payne
*Assistant Examiner* — Casey Kretzer
(74) *Attorney, Agent, or Firm* — Staas & Halsey LLP

(57) ABSTRACT

An optical transmitter includes an optical modulator to modulate light output from a light source with a drive signal, a monitor to detect an average value and an alternating-current (AC) component of output light intensity of the optical modulator, and a controller to select one of a first bias control and a second bias control in accordance with an amplitude of the drive signal. The first bias control controls a bias voltage of the drive signal based on the average value, and the second bias control controls the bias voltage of the drive signal based on the AC component.

13 Claims, 27 Drawing Sheets

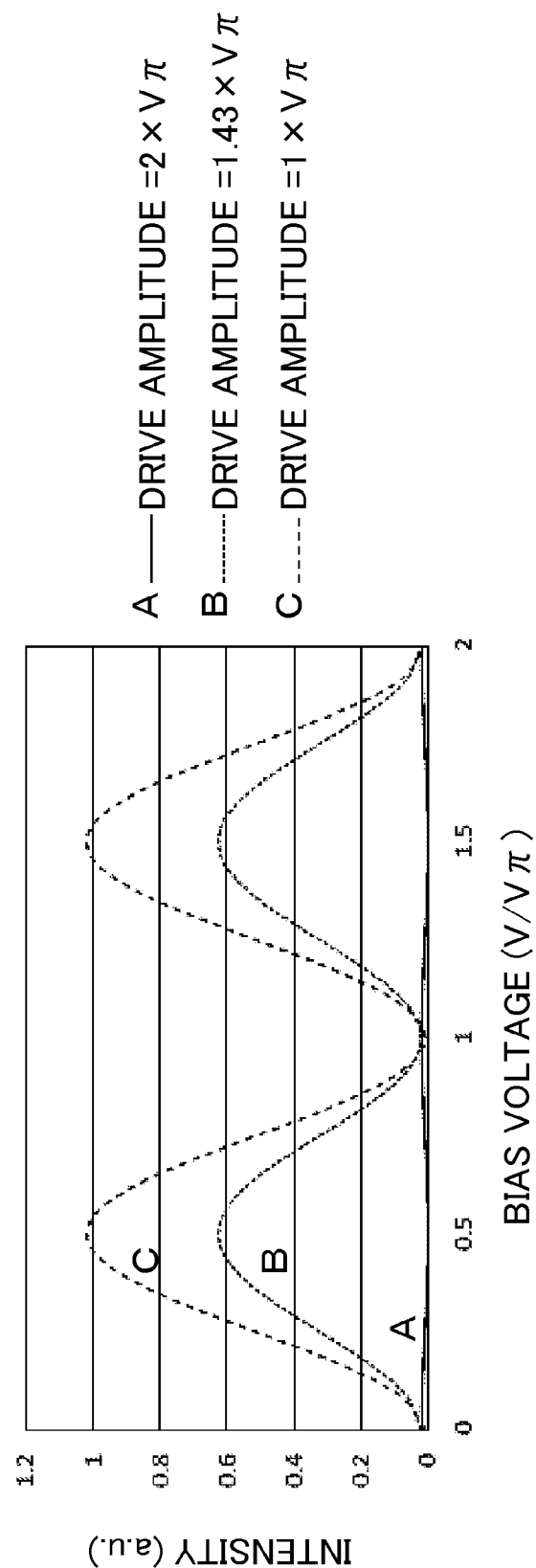

ROLL-OFF RATE = 0

ROLL-OFF RATE = 0.5

ROLL-OFF RATE = 1

OPTICAL TRANSMITTER AND CONTROL APPARATUS OF OPTICAL MODULATOR

CROSS-REFERENCE TO RELATED APPLICATION

This application is based upon and claims the benefit of priority of the prior Japanese Patent Application No. 2013-269649, filed on Dec. 26, 2013, the entire contents of which are incorporated herein by reference.

FIELD

The embodiment(s) discussed herein relates to an optical transmitter and a control apparatus of an optical modulator.

BACKGROUND

An technology relating to an optical transmitter is disclosed in JP 2008-92172 A. JP 2008-92172 A discloses that a modulation scheme such as a CS-RZ modulation scheme, an optical duo-binary modulation scheme, a DPSK modulation scheme, and a DQPSK modulation scheme performs a modulation with an electric signal having an amplitude of 2×Vπ which corresponds to a voltage range including a peak, a bottom and a peak indicated in a drive voltage to light intensity characteristic of an LN modulator. LN is an abbreviated name of lithium niobate. Vπ represents a voltage capable of changing a phase of the LN modulator by π and is called a "half wavelength voltage".

According to JP 2008-92172 A, in order to control a bias voltage of the LN modulator, a signal with a frequency f0 is superimposed on an amplitude of a drive signal and a variation (or a fluctuation) of an amplitude of an output light signal of the LN modulator is detected.

For example, when the bias voltage is at the optimal value, no f0 component arises in the output light signal of the LN modulator. Meanwhile, when the bias voltage deviates from the optimal value, an f0 component arises in the output light signal.

The direction in which the bias voltage deviates from the optimal value (hereinafter, may be referred to as a "bias deviation") can be detected based on the phase of the f0 component, which is reversed depending on the direction in which the bias voltage deviates from the optimal value. Therefore, the bias voltage can be controlled to the optimal value by adjusting the bias voltage such that no f0 component arises.

Incidentally, the technology to detect a bias deviation by superimposing a low-frequency signal on a drive signal of a modulator is also disclosed in JP 2013-110620 A and JP 2013-88702 A.

In recent years, a transmission characteristic is improved by introducing digital signal processing technology in optical communication. In an optical transmitter, the technology of digital signal processing performing on an optical transmission waveform attracts attention. For example, it is known that a variance (or dispersion) pre-equalization technology to add an inverse dispersion for a chromatic dispersion generated in an optical fiber to a transmission waveform in advance.

In response to a change of the waveform of a transmission signal, the peak drive amplitude for the average amplitude of a drive signal (hereinafter, may be referred to as an "average drive amplitude") may be increased. In such a case, the average drive amplitude may be set to an amplitude smaller than 2×Vπ to enable light conversion at the peak drive amplitude. However, when the average drive amplitude is set to an amplitude smaller than 2×Vπ, there is a specific amplitude which makes an appropriate bias control impossible. Thus, there is a case where the bias control may be impossible. The specific amplitude is described in, for example, JP 2013-110620 A and JP 2013-88702 A.

SUMMARY

An aspect of an optical transmitter includes: an optical modulator to modulate light output from a light source with a drive signal to output the modulated light; a monitor to detect an average value and an alternating-current (AC) component of output light intensity of the optical modulator; and a controller to select one of a first bias control and a second bias control in accordance with an amplitude of the drive signal. The first bias control controls a bias voltage of the drive signal based on the average value and the second bias control controls the bias voltage of the drive signal based on the AC component.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 10 and 11 are diagrams illustrating exemplary relationship between changes of a light intensity alternating-current (AC) component and the drive amplitude calculated by using the drive amplitude of the optical modulator illustrated in FIG. 2 as a parameter;

DESCRIPTION OF EMBODIMENTS

Figure 1:
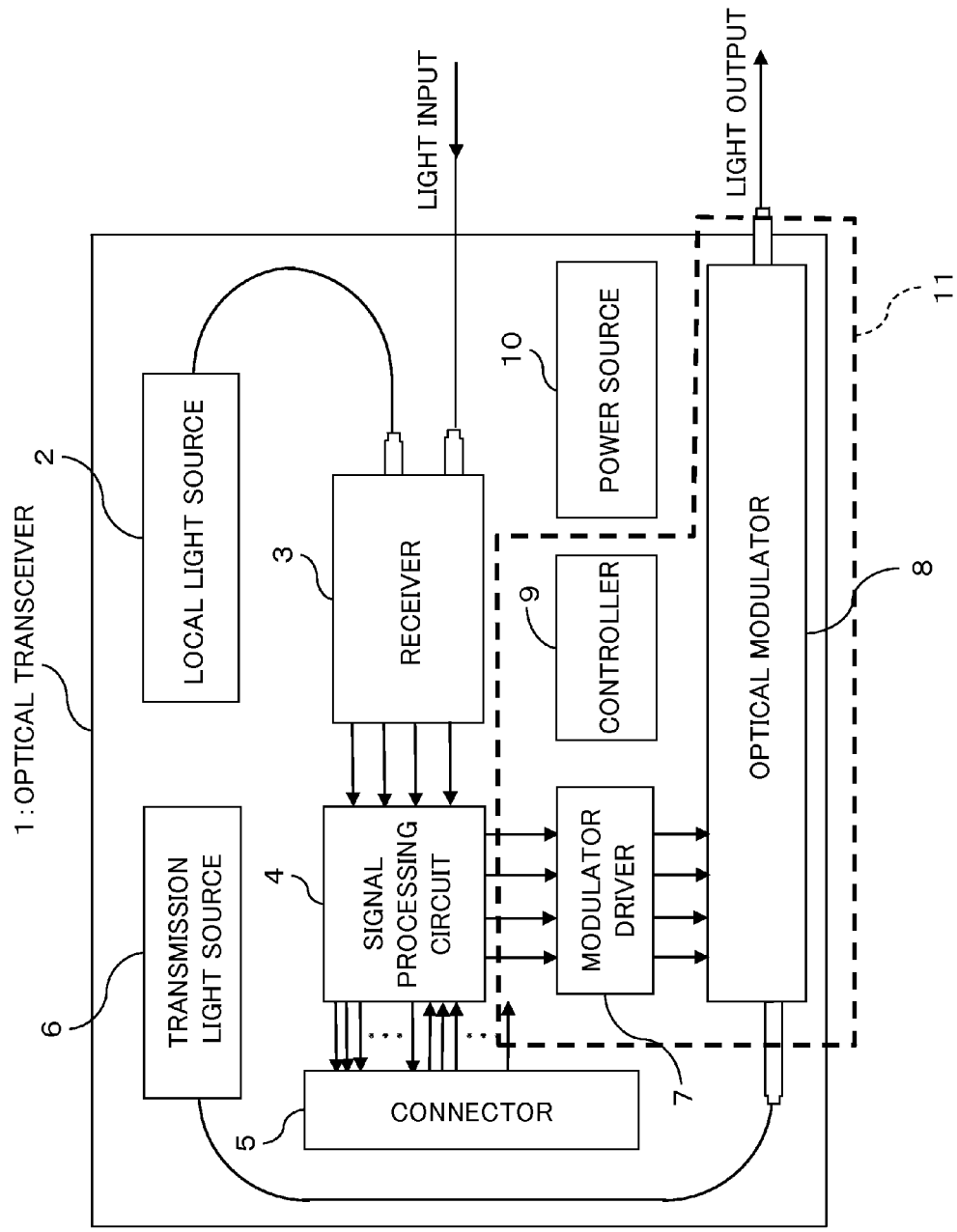
FIG. 1 is a block diagram illustrating an exemplary configuration of an optical transceiver according to an embodiment.

Hereinafter, embodiments will be described with reference to the drawings. However, the embodiments described below are merely exemplary and does not intend to exclude application of various modifications and technologies that are not explicitly described below. Unless otherwise noted, portions to which the same reference sign is attached represent the same or similar portions in the drawings used in the following embodiments.

An Embodiment

FIG. 1 is a block diagram illustrating an exemplary configuration of an optical transceiver according to an embodiment. An optical transceiver 1 depicted in FIG. 1 includes, for example, a local light source 2, a receiver 3, a signal processing circuit 4, a connector 5, a transmission light source 6, a modulator driver 7, an optical modulator 8, a controller 9, and a power source 10.

The local light source 2 is operable to generate local light which is mixed with received signal light in the receiver 3 to perform an optical detection. A laser diode (LD) is applicable to the local light source 2, for example.

The receiver 3 is operable to mix signal light received from an optical transmission line using an optical fiber or the like and local light from the local light source 2 to perform the optical detection. The receiver 3 is also operable to photoelectrically convert the light detected by the optical detection to convert the received signal light into an electric signal. The receiver 3 may include a polarized beam splitter (PBS), optical (90°) hybrid, a photo detector such as photodiode (PD), a trans-impedance amplifier (TIA), and an AD converter (ADC) or the like.

The signal processing circuit 4 is operable to perform digital signal processing (or reception processing) appropriate for a reception of an electric signal input from the receiver 3. The reception processing may include, for example, any of a polarization separation, chromatic dispersion compensation, polarization mode dispersion compensation, demodulation processing, and error correction and decoding processing. Further, the signal processing circuit 4 is operable to perform digital signal processing (or transmission processing) appropriate for transmission. The transmission processing may include, for example, any of multiplexing of electric signals in accordance with the transmission frame, variance pre-equalization, and Nyquist filtering. The signal processing circuit 4 may be realized by using a processor with operation capabilities such as an LSI, a DSP or the like.

The connector 5 is available to provide an interface to transceive an electric signal between the optical transceiver 1 and an external device of the optical transceiver 1.

The transmission light source (hereinafter, may simply referred to as a "light source") 6 is operable to generate light for transmission. A semiconductor laser such as a laser diode is applicable to the transmission light source 6, for example.

The modulator driver 7 is operable to generate a drive signal for the optical modulator 8 in accordance with a drive control signal provided by the signal processing circuit 4.

The optical modulator 8 is operable to modulate light input from the light source 6 with a drive signal provided by the modulator driver 7. A Mach-Zehnder (MZ) optical modulator is applicable to the optical modulator 8 used in the optical transceiver 1 available for high-speed transmission of 10 Gbps or more.

It is applicable an optical modulation scheme to the optical modulator 8, which scheme modulates continuous wave light from the light source 6 with a drive signal having an amplitude of 2×Vπ that corresponds to a voltage range including a peak, a bottom and a peak indicated in a drive signal (or drive voltage) to light intensity characteristic of the optical modulator 8. Examples of such an optical modulation scheme may include the CS-RZ modulation scheme, the optical duo-binary modulation scheme, the differential phase shift keying (DPSK) modulation scheme, the quadrature phase shift keying (QPSK) scheme, and the differential quadrature phase shift keying (DQPSK) modulation scheme.

The controller 9 is operable to control the operation of the optical transceiver 1. The control may include a control of operating states of the receiver 3, the modulator driver 7, and the optical modulator 8.

The power source 10 is available to generate a voltage adaptive to the operation of the optical transceiver 1 and to supply the voltage to each unit which requires power supply.

In FIG. 1, a block including the modulator driver 7, the optical modulator 8, and the controller 9 as indicated by a dotted line frame 11 forms an example of an optical transmission unit. The optical transmission unit 11 may also referred to as an optical transmitter 11.

Figure 2:
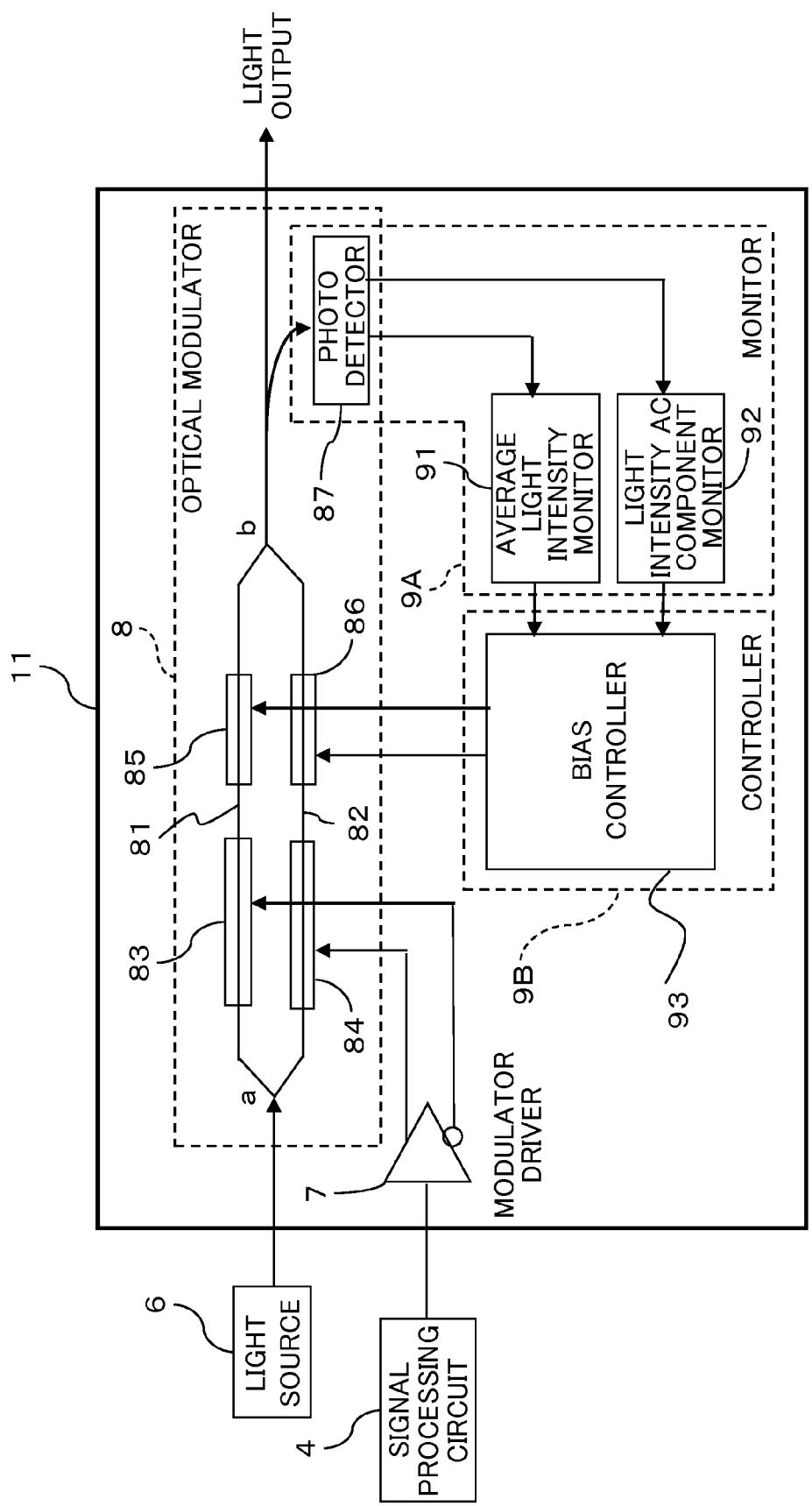
FIG. 2 is a block diagram illustrating an exemplary configuration of the optical transceiver focusing on an optical transmission unit illustrated in FIG. 1.

Next, an exemplary configuration of the optical transceiver 1 focusing on the optical transmission unit 11 is illustrated in FIG. 2. The optical transmission unit 11 illustrated in FIG. 2 includes an MZ optical modulator as an example of the optical modulator 8, a monitor 9A, and a controller 9B. The monitor 9A may include, for example, an optical detector 87, an average light intensity monitor 91, and a light intensity AC component monitor 92.

The MZ optical modulator 8 may include two optical waveguides 81 and 82 branched at a branch point a and joined at a confluence point b, drive electrodes 83 and 84 and bias control electrodes 85 and 86 respectively provided on the optical waveguides 81 and 82, and the optical detector 87.

An optical splitter may be provided at the branch point a, for example. Further, an optical combiner may be provided at the confluence b, for example.

A drive signal is provided to each of the drive electrodes 83 and 84 from the modulator driver 7. The drive signal may be a voltage signal generated by the modulator driver 7 in accordance with a transmission data signal generated by the signal processing circuit 4. One of the two drive signals is a signal whose polarity is reversed from that of the other drive signal.

By providing such drive signals to the drive electrodes 83 and 84 respectively, the phase of light propagating through each of the optical waveguides 81 and 82 can be controlled. Thus, an optical interference state at the confluence point b of light propagating through the two optical waveguides 81 and 82 is controlled. Thereby, modulated light in which the optical phase changes in accordance with the optical interference state can be obtained.

A control voltage to control the bias voltage (in other words, the operating point) of the MZ optical modulator 8 is provided to each of the bias control electrodes 85 and 86 from a bias controller 93. Quality of transmission signal light can be improved by setting the operating point of the MZ optical modulator 8 to an appropriate state with the drive signals provided to the drive electrodes 83 and 84.

For example, the bias voltage of the MZ optical modulator 8 may be controlled such that the amplitude center of a transmission data signal in a position where the light intensity of drive voltage to light intensity characteristics of the MZ optical modulator 8 becomes minimum. The control of the bias voltage may be performed by the bias controller 93. An example of bias voltage control performed by the bias controller 93 will be described later.

The optical detector 87 is operable to receive a part of output light of the MZ optical modulator 8 as detection light (or monitor light) and to generate an electric signal (hereinafter, may also be called a "monitor signal" or a "detection signal") in accordance with received light power thereof. The optical detector 87 may include, for example, any of a light receiving element such as a photodiode (PD) and an amplifier (for example, TIA) operable to convert a current in accordance with received light power output from the light receiving element into a voltage.

An applicable structure to branch a part of output light of the MZ optical modulator 8 and to input into the optical detector 87 is no object. An optical branch such as an optical coupler may be applicable to branch a part of output light of the MZ optical modulator 8 and to input the branched light into the optical detector 87. The monitor signal may be input into both of the average light intensity monitor 91 and the light intensity AC component monitor 92.

The average light intensity monitor 91 is operable to detect an average value (in other words, an average value of output light intensity of the MZ optical modulator 8) of a monitor signal (for example, a voltage) input from the optical detector 87. An electric amplifier is applicable to the average light intensity monitor 91. The average light intensity monitor 91 is an example of a first monitor and may also be referred to as a "voltage monitor" since the monitor 91 monitors the voltage.

The light intensity AC component monitor 92 is operable to detect an AC component included in a monitor signal input from the optical detector 87. The light intensity AC component monitor 92 may detect a root-mean-square value (in other words, power) of the AC component. The light intensity AC component monitor 92 is an example of a second monitor and may also be referred to as a "power monitor" since the monitor 92 monitors the power.

As a non-restrictive example, an RMS-DC converter is applicable to the light intensity AC component monitor 92. RMS is an abbreviation of the root mean square value and DC means a direct current voltage (DC voltage). Therefore, the RMS-DC converter is operable to convert AC component power included in a monitor signal input from the optical detector 87 into a DC voltage. Examples of the RMS-DC converter may be converters marketed by the Analog Devices and the Linear Technology.

Since the monitor 9A includes the optical detector 87 and both of the monitors 91 and 92, the monitor 9A is operable to detect (or monitor) an average intensity value and an AC component of modulated light that is an output light of the MZ optical modulator 8. With the above configuration of the monitor 9A, the average intensity value and the AC component of modulated light output from the MZ optical modulator 8 can be detected reliably.

The bias controller 93 is operable to selectively utilize one of the monitor (or detection) results of the monitors 91 and 92 to control the bias voltage provided to the bias control electrodes 85 and 86 to thereby optimize the bias voltage such that the operating point of the MZ optical modulator 8 becomes the optimal point.

The bias controller 93 (or a bias controller 93A or 93B described later in FIGS. 16, 19, and 26) included in the controller 9B may serves as an example of a control apparatus operable to control the bias of the optical modulator 8 together with the monitor 9A. The monitor 9A and the controller 9B may be included in the controller 9 illustrated in FIG. 2.

Here, an example of the bias voltage control based on a monitor result by the average light intensity monitor 91 will be described with reference to FIGS. 3 and 4.

It is assumed that a low-frequency signal with a small amplitude is superimposed on a drive signal of the MZ optical modulator 8 by using a low-frequency oscillator or the like. The low-frequency signal is a signal with a frequency sufficiently lower than that of the drive signal and the frequency of the low-frequency signal has a kilo hertz (kHz)-order while the frequency of the drive signal has a giga hertz (GHz)-order, for example. Hereinafter, a frequency component of the low-frequency signal is represented as an f0 component.

By superimposing the low-frequency signal on a drive signal, a modulated light signal output from the MZ optical modulator 8 includes the f0 component. The operating point of the MZ optical modulator 8 can be optimized by controlling feedback of the bias voltage of the MZ optical modulator 8 such that the f0 component is brought closer to zero.

Figure 3:
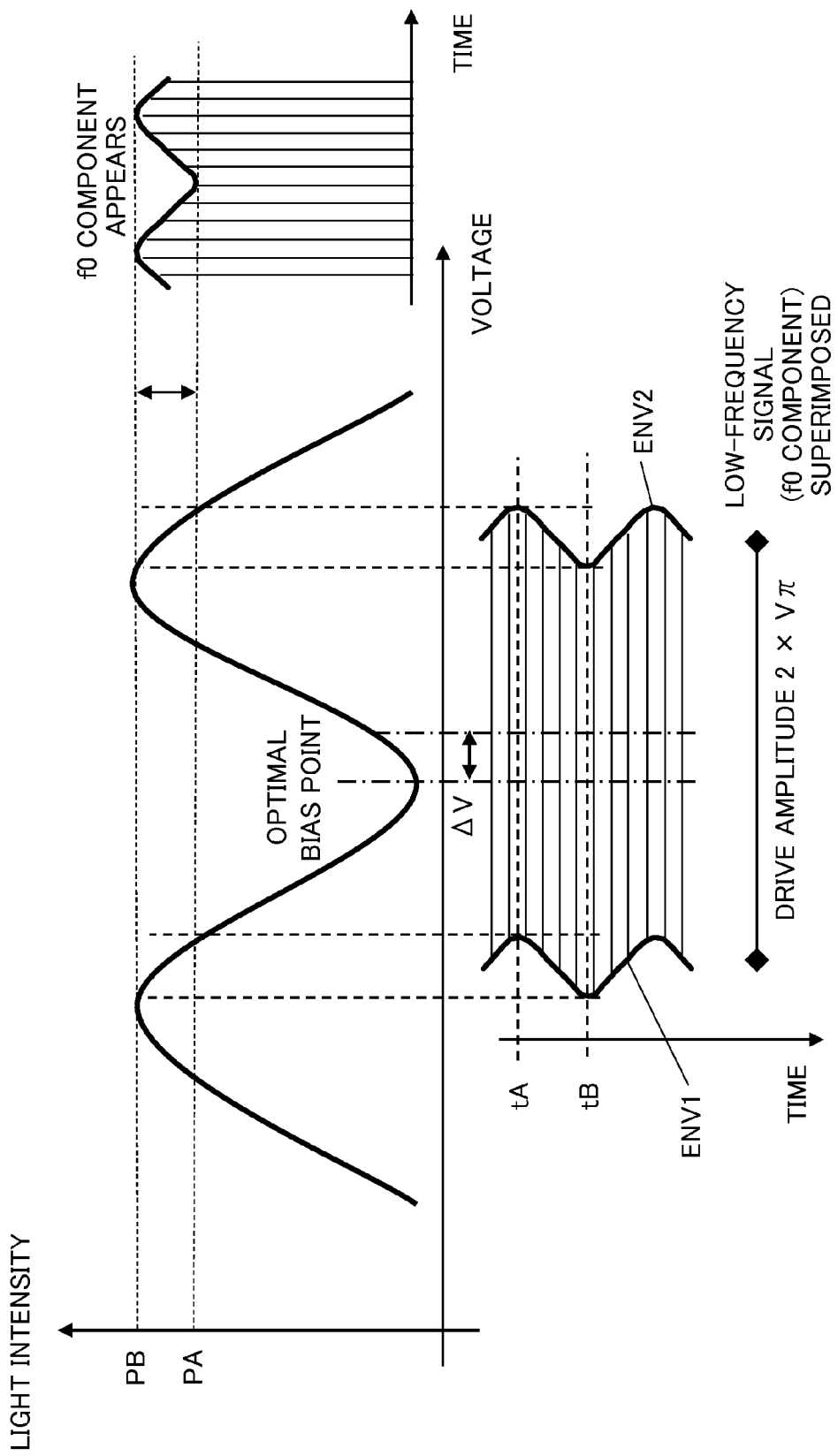
FIGS. 3 and 4 are diagrams illustrating an exemplary relationship between a drive signal and an operating point of an optical modulator illustrated in FIG. 2.
Figure 4:
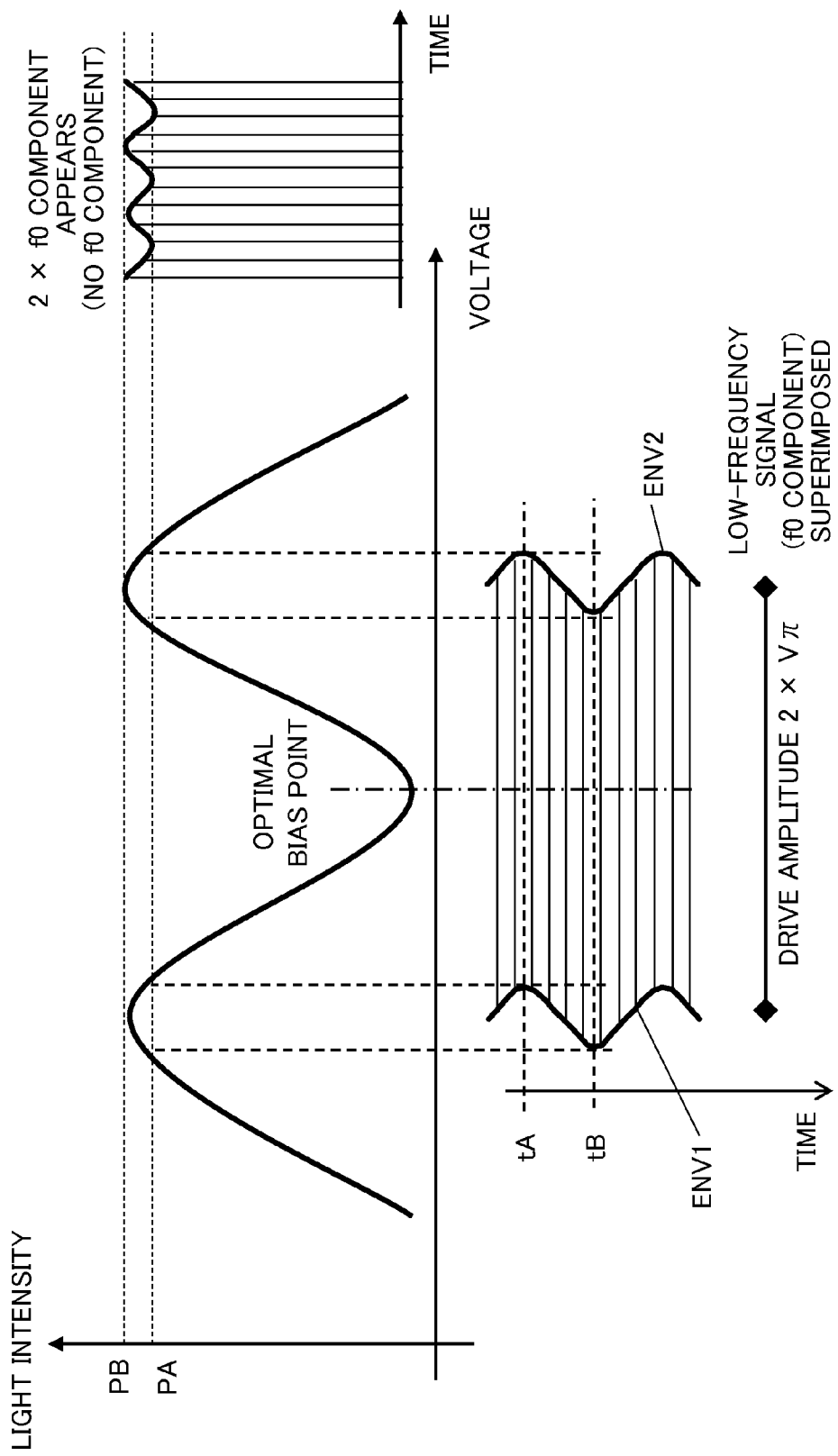

FIGS. 3 and 4 are diagrams illustrating examples of the relationship between a drive signal provided to the MZ optical modulator 8 and the operating point of the MZ optical modulator 8. In FIGS. 3 and 4, how the f0 component is observed in output of the MZ optical modulator 8 is illustrated. The amplitude of the drive signal (hereinafter, may be referred to as the "drive amplitude") is set to twice a half wavelength voltage $V\pi$ (i.e., $2\times V\pi$).

The half wavelength voltage $V\pi$ corresponds to a voltage width capable of changing the phase of the MZ optical modulator 8 by $\pi$. In other words, the half wavelength voltage $V\pi$ has a voltage width in which optical output indicated in the drive amplitude (drive voltage) to optical output characteristic of the MZ optical modulator 8 changes from the maximum to the minimum. By setting the drive voltage to $2\times V\pi$, it is enable to maximize the output light intensity of the MZ optical modulator 8.

FIG. 3 illustrates a case where the bias voltage (or operating point) deviates from the optimal value and FIG. 4 illustrates a case where the bias voltage (operating point) is at the optimal value. As illustrated in FIGS. 3 and 4, by superimposing the f0 component on the drive signal, each of an envelope ENV1 on the low voltage side of the drive amplitude and an envelope ENV2 on the high voltage side varies at the frequency f0.

Then, as illustrated in FIG. 3, when the bias voltage (operating point) deviates from the optimal value by $\Delta V$, the output light intensity of the MZ optical modulator 8 changes (or increases and decreases) in accordance with periodic amplitude changes of the envelopes ENV1 and ENV2 of the drive amplitude.

For example, PA depicted in FIG. 3 indicates the output light intensity of the MZ optical modulator 8 at time to when the amplitudes of the envelopes ENV1 and ENV2 are at a peak. Thereafter, the output light intensity of the MZ optical modulator 8 at time tB when the amplitudes of the envelopes ENV1 and ENV2 are at a bottom increases to PB from PA. The output light intensity of the MZ optical modulator 8 repeatedly increases and decreases with time between PA and PB in accordance with changes in amplitude of the envelopes ENV1 and ENV2. Therefore, changes of the output light intensity of the MZ optical modulator 8 with respect to time are as illustrated in the right end of FIG. 3 and the f0 component appears in output light of the MZ optical modulator 8.

Meanwhile, when the bias voltage (operating point) is the optimal point as illustrated in FIG. 4, no f0 component appears in output light of the MZ optical modulator 8 and instead, a component twice the f0 component (i.e., $2\times f0$ component) appears. In other words, focusing on a time between time to and time tB that are the same timings as in FIG. 3, when the amplitudes of the envelopes ENV1 and ENV2 change from the peak to the bottom, the output light intensity of the MZ optical modulator 8 varies to take the maximum value twice. Therefore, changes of the output light intensity of the MZ optical modulator 8 with respect to time are as illustrated in the right end of FIG. 4 and the $2\times f0$ component appears in output light of the MZ optical modulator 8.

Thus, the f0 component appeared in output light of the MZ optical modulator 8 changes in accordance with the amount of deviation from the optimal value of the bias voltage (hereinafter, may be referred to as the "bias deviation"). Therefore, with controlling the bias voltage such that the f0 component becomes minimum, the bias voltage can be controlled to the optimal value.

Next, a phenomenon which makes it difficult to control the bias voltage to the optimal value when the average amplitude (average drive amplitude) of the drive signal of the MZ optical modulator 8 is set to an amplitude smaller than $2\times V\pi$ will be described with reference to FIGS. 5 and 6.

Figure 5:
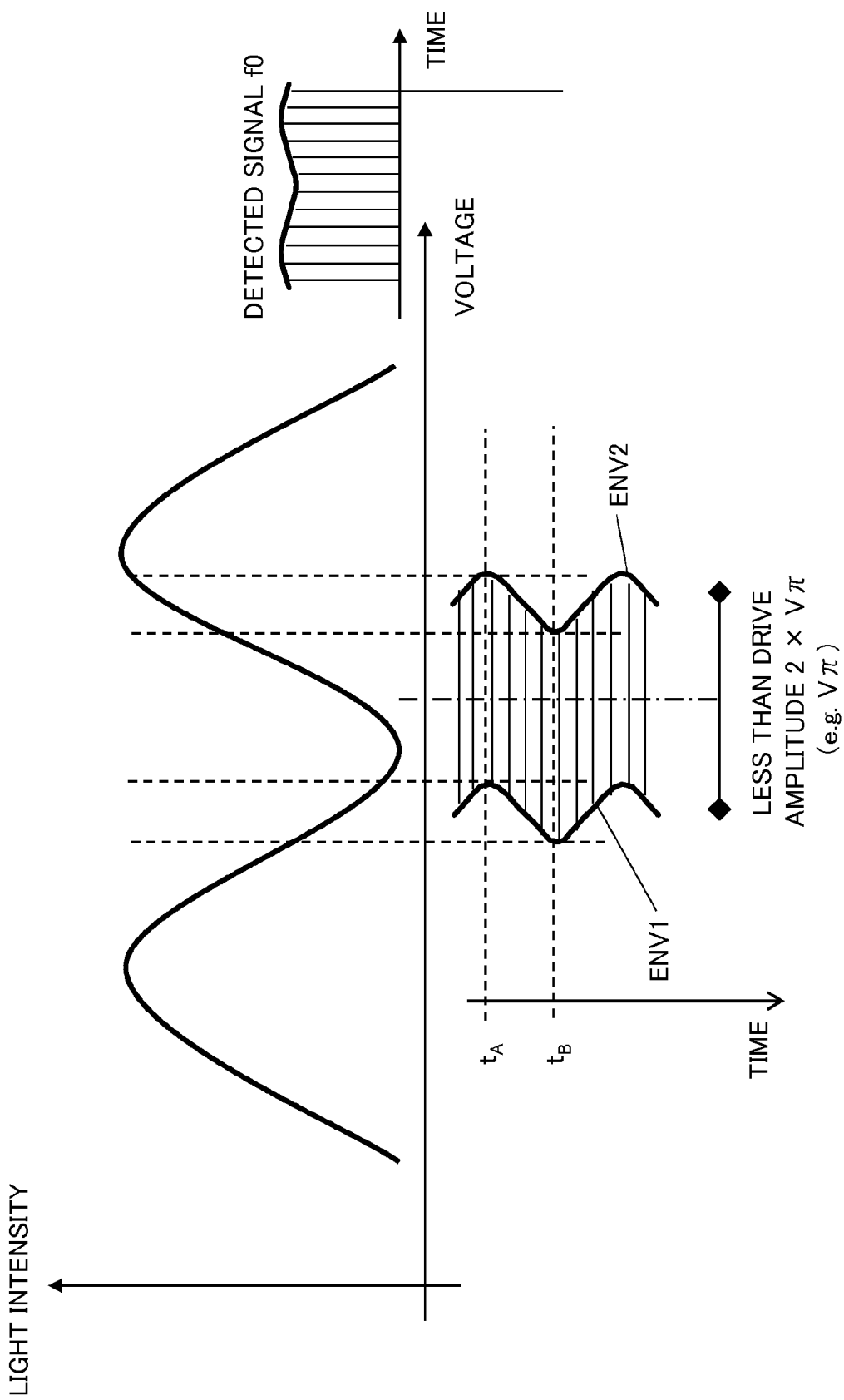
FIG. 5 is a diagram illustrating an example of output light intensity changes of the optical modulator when an f0 component is superimposed on the drive signal of the optical modulator illustrated in FIG. 2 and when an average drive amplitude is set to an amplitude smaller than 2×Vπ.

FIG. 5 is a diagram illustrating an example of changes of output light intensity of the MZ optical modulator 8 when the f0 component is superimposed on a drive signal of the MZ optical modulator 8 and when the average drive amplitude is set to an amplitude smaller than $2V\pi$ (for example, equal to about $V\pi$).

As illustrated in FIG. 5, at time tA, the output light intensity increases with respect to the envelope ENV2 on the high voltage side and the output light intensity decreases with respect to the envelope ENV1 on the low voltage side. At time tB thereafter, the output light intensity decreases with respect to the envelope ENV2 on the high voltage side and the output light intensity increases with respect to the envelope ENV1 on the low voltage side.

In other words, in both cases, output light intensity of the MZ optical modulator 8 changes in such a way that the changes are canceled out. Thus, when the average drive amplitude is smaller than $2\times V\pi$, changes of output light intensity obtained by superimposing the f0 component on a drive signal are smaller than changes in a case where the average drive amplitude is $2\times V\pi$. In other words, a detection sensitivity of changes of output light intensity decreases. Hereinafter, the "average drive amplitude" may simply be referred to as the "drive amplitude".

Figure 6:
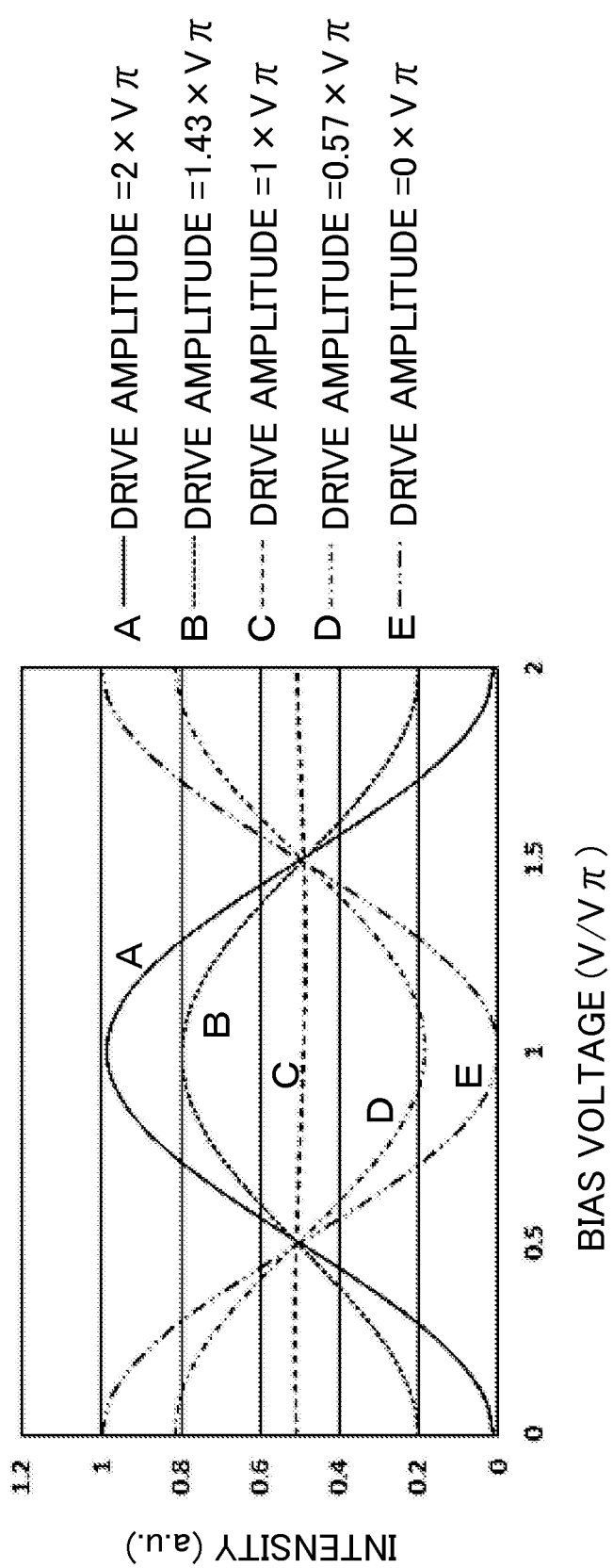
FIG. 6 is a diagram illustrating an exemplary relationship between a bias voltage and output light intensity of the optical modulator calculated by using a drive amplitude of the optical modulator illustrated in FIG. 2 as a parameter.

FIG. 6 is a diagram illustrating an exemplary relationship between the bias voltage and the output light intensity of the MZ optical modulator 8 calculated by using the drive amplitude as a parameter. In FIG. 6, graphs (characteristics) A to E illustrate relationships between the bias voltage and the output light intensity of the MZ optical modulator 8 when the drive amplitude is set to $2\times V\pi$, $1.43\times V\pi$, $1\times V\pi$, $0.57\times V\pi$, and $0\times V\pi$ respectively. The bias voltage (V) is normalized with respect to $V\pi$.

With a focus on a characteristic A when the drive amplitude is set to $2\times V\pi$ (for example, as illustrated in FIGS. 3 and 4), the output light intensity of the MZ optical modulator 8 increases as an increase of the bias voltage V from 0 and reaches the maximum value at V=Vπ. By increasing the bias voltage V further, the output light intensity of the MZ optical modulator 8 decreases.

Superimposing a low-frequency signal with a small amplitude on a drive signal is equivalent to superimposing a low-frequency component with a small amplitude on a bias voltage, and the change of output light intensity is minimum at Vπ corresponding to an inflection point. Thus, as described with reference to FIGS. 3 and 4, it becomes possible to perform the bias control by observing changes of the output light intensity caused by superimposing the f0 component on the drive signal.

In contrast, when the drive amplitude V is decreased to Vπ, which is smaller than 2×Vπ, as described with reference to FIG. 5, changes of the output light intensity obtained by superimposing the f0 component on the drive signal decrease (see characteristics B and C). When the drive amplitude V=Vπ, as illustrated in the characteristic C, it becomes marked that a phenomenon in which changes of the f0 component appeared in output light of the MZ optical modulator 8 become smaller.

Upon further making the drive amplitude V smaller than Vπ, although the output light intensity decreases, as illustrated in the characteristics D and E, changes of the output light intensity obtained by superimposing the f0 component on the drive signal become larger again than changes in a case where V=Vπ. In other words, a detection sensitivity of changes of output light intensity improves.

A problem comes up when the drive amplitude V=Vπ because no change or little change in output light intensity of the MZ optical modulator 8 occurs with respect to fluctuations of the bias voltage, and therefore, a monitor result used for a bias voltage control is practically unavailable in the average light intensity monitor 91 illustrated in FIG. 2. As a result, it becomes difficult or practically impossible for the bias controller 93 to perform the bias voltage control.

Thus, in the present embodiment, the bias voltage control is enabled to be appropriately performed even if the drive voltage V is smaller than 2×Vπ by supplementarily using a monitor result of the light intensity AC component monitor 92 in the bias controller 93.

The operation of both of the monitors 91 and 92 will be described with reference to FIGS. 7 to 10.

Figure 7A:
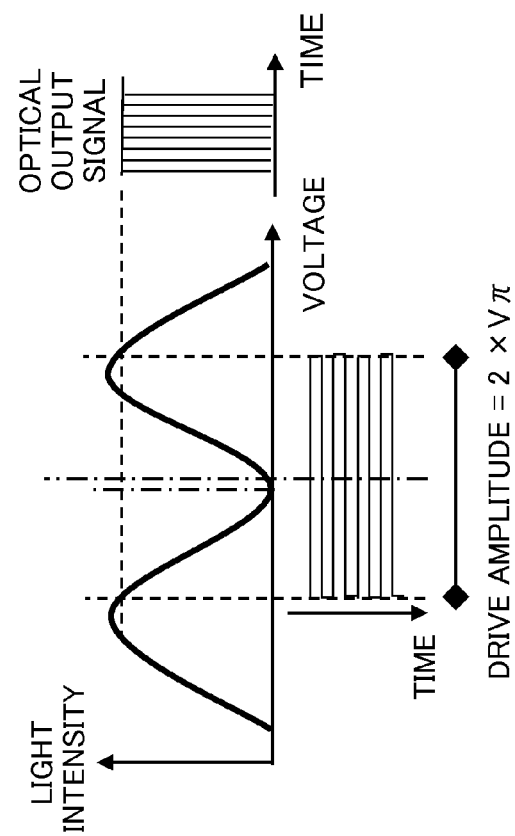
FIG. 7A is a diagram illustrating an exemplary relationship between the drive signal and the operating point of the optical modulator when the drive amplitude of the optical modulator illustrated in FIG. 2 is set to 2×Vπ and when the bias voltage is in the optimal value.
Figure 7B:
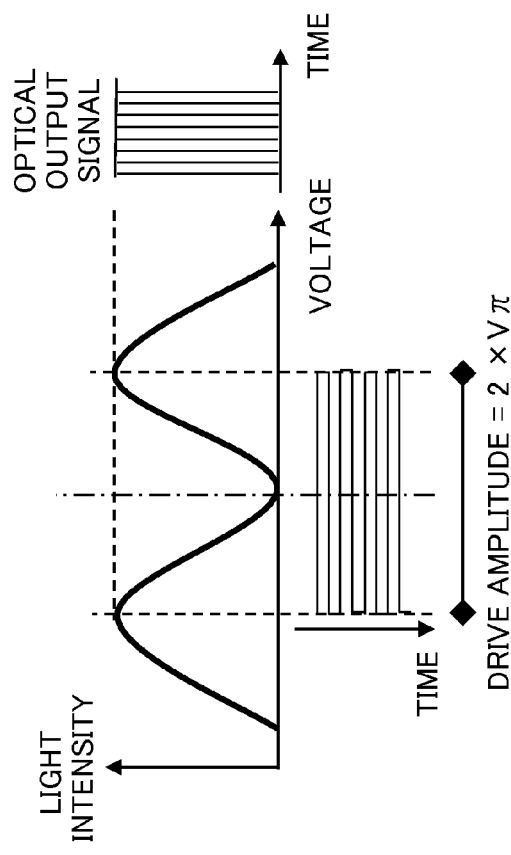
FIG. 7B is a diagram illustrating an exemplary relationship between the drive signal and the operating point of the optical modulator when the drive amplitude of the optical modulator illustrated in FIG. 2 is set to 2×Vπ and when the bias voltage deviates from the optimal value.

FIGS. 7A and 7B are diagrams illustrating exemplary relationship between a drive signal and the operating point of the MZ optical modulator 8 when the drive amplitude of the MZ optical modulator 8 is set to 2×Vπ. FIG. 7A illustrates a case where the bias voltage is at the optimal value and FIG. 7B illustrates a case where the bias voltage deviates from the optimal value. To make the description easier to understand, it is assumed that the drive signal is an alternating signal of "1010 . . . " and that the band available to be monitored is sufficiently wide.

As illustrated in FIG. 7A, when the bias voltage is at the optimal value, the output light intensity of the MZ optical modulator 8 indicates the same fluctuations on the high voltage side and the low voltage side with respect to the center of the drive amplitude 2×Vπ. Also, as illustrated in FIG. 7B, when the bias voltage deviates from the optimal value, the output light intensity of the MZ optical modulator 8 indicates the same fluctuations on the high voltage side and the low voltage side with respect to the center of the drive amplitude 2×Vπ.

Therefore, as illustrated in FIGS. 7A and 7B, there is no difference of the average intensity of light output from the MZ optical modulator 8 between the case where the bias voltage is at the optimal value and the case where the bias voltage deviates from the optimal value. In other words, the light intensity output on average on the time axis from the MZ optical modulator 8 is constant.

Figure 8A:
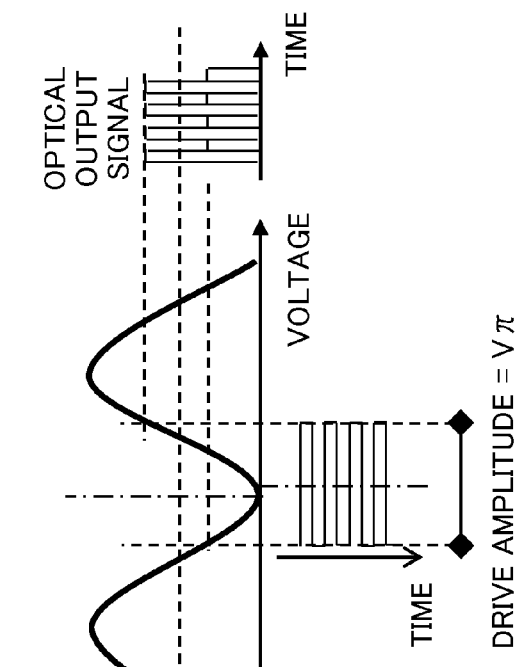
FIG. 8A is a diagram illustrating an exemplary relationship between the drive signal and the operating point of the optical modulator when the drive amplitude of the optical modulator illustrated in FIG. 2 is set to Vπ and when the bias voltage in the optimal value.
Figure 8B:
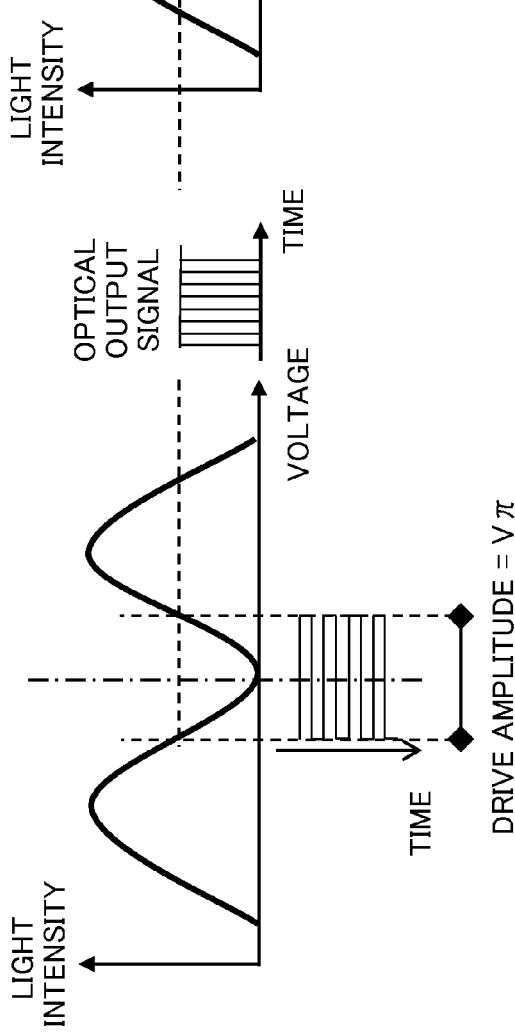
FIG. 8B is a diagram illustrating an exemplary relationship between the drive signal and the operating point of the optical modulator when the drive amplitude of the optical modulator illustrated in FIG. 2 is set to Vπ and when the bias voltage deviates from the optimal value.

In contrast, when the drive voltage is set to, for example, Vπ (<2×Vπ), as illustrated in FIGS. 8A and 8B, different temporal fluctuations in intensity of light output from the MZ optical modulator 8 arise between the case where the bias voltage is at the optimal value and the case where the bias voltage deviates from the optimal value.

As illustrated in, for example, FIG. 8A, when the bias voltage is at the optimal value, the output light intensity of the MZ optical modulator 8 indicates the same fluctuations on the high voltage side and the low voltage side with respect to the center of the drive amplitude Vπ. Therefore, the average light intensity output from the MZ optical modulator 8 is constant in time.

On the other hand, as illustrated in, for example, FIG. 8B, when the bias voltage deviates from the optimal value, the output light intensity of the MZ optical modulator 8 indicates different fluctuations on the high voltage side and the low voltage side with respect to the center of the drive amplitude Vπ. Therefore, the output light intensity from the MZ optical modulator 8 fluctuates in time.

However, even in the case illustrated in FIG. 8B, the amount of fluctuations in output light intensity is the same in up and down directions. Thus, the average output light intensity is the same as the case illustrated in FIG. 8A. Therefore, the detection result of the average light intensity monitor 91 does not change regardless of the state of the bias voltage. This is consistent with the result (characteristic C) illustrated in FIG. 6.

On the other hand, while a signal obtained by converting output light of the MZ optical modulator 8 into an electric signal becomes a direct current in the case illustrated in FIG. 8A, an AC component in accordance with fluctuations output light intensity appears in a signal obtained by converting output light of the MZ optical modulator 8 into an electric signal in the case illustrated in FIG. 8B.

Therefore, by detecting the AC component by using the light intensity AC component monitor 92, it is available to detect a bias deviation (the degree to which the bias voltage deviates from the optimal value). As described above, to make the description easier to understand, it is assumed that the drive signal is an alternating signal of "1010 . . . " and that the band available to be monitored is sufficiently wide. However, the actual drive signal is not a simple repeated signal, and therefore, the band available to be monitored is limited.

Figure 9A:
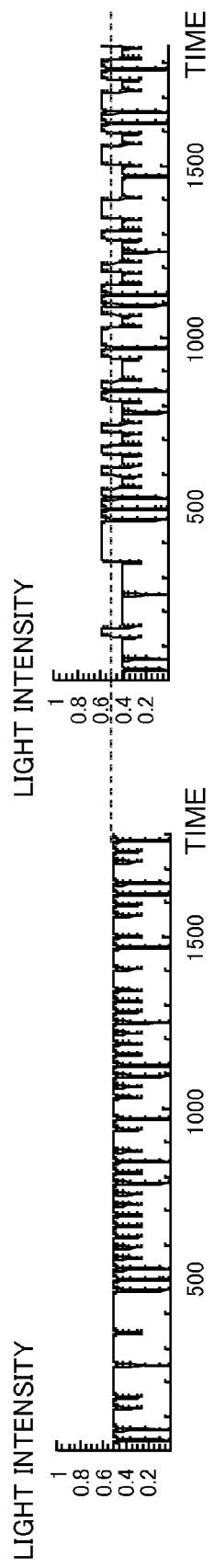
FIG. 9A is a diagram illustrating an exemplary variation of the output light intensity of the optical modulator with respect to the time when the drive voltage is set to Vπ and when the bias voltage is in the optimal value.
Figure 9B:
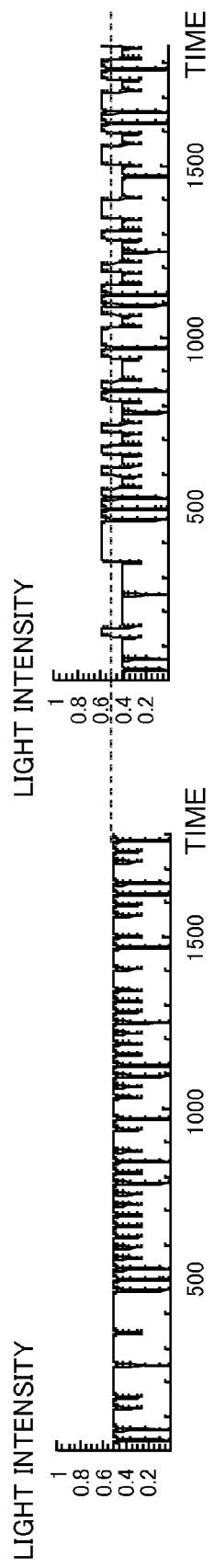
FIG. 9B is a diagram illustrating an exemplary variation of the output light intensity of the optical modulator with respect to the time when the drive voltage is set to Vπ and when the bias voltage deviates from the optimal value.

Output light of the MZ optical modulator 8 corresponding to an actual drive signal is as illustrated in FIGS. 9A and 9B. FIG. 9A illustrates fluctuations of output light intensity with respect to time of the MZ optical modulator 8 in the case of, for example, FIG. 8A (when the drive amplitude is Vπ and the bias voltage is the optimal value). In contrast, FIG. 9B illustrates fluctuations of output light intensity with respect to time of the MZ optical modulator 8 in the case of, for example, FIG. 8B (when the drive amplitude is Vπ and the bias voltage deviates from the optimal value).

Since the actual drive signal includes, as illustrated in FIG. 9B, a portion in which the same code continues, a low-frequency component is generated and so an AC component can reliably be detected even if the band available to be monitored is limited.

Figure 11:
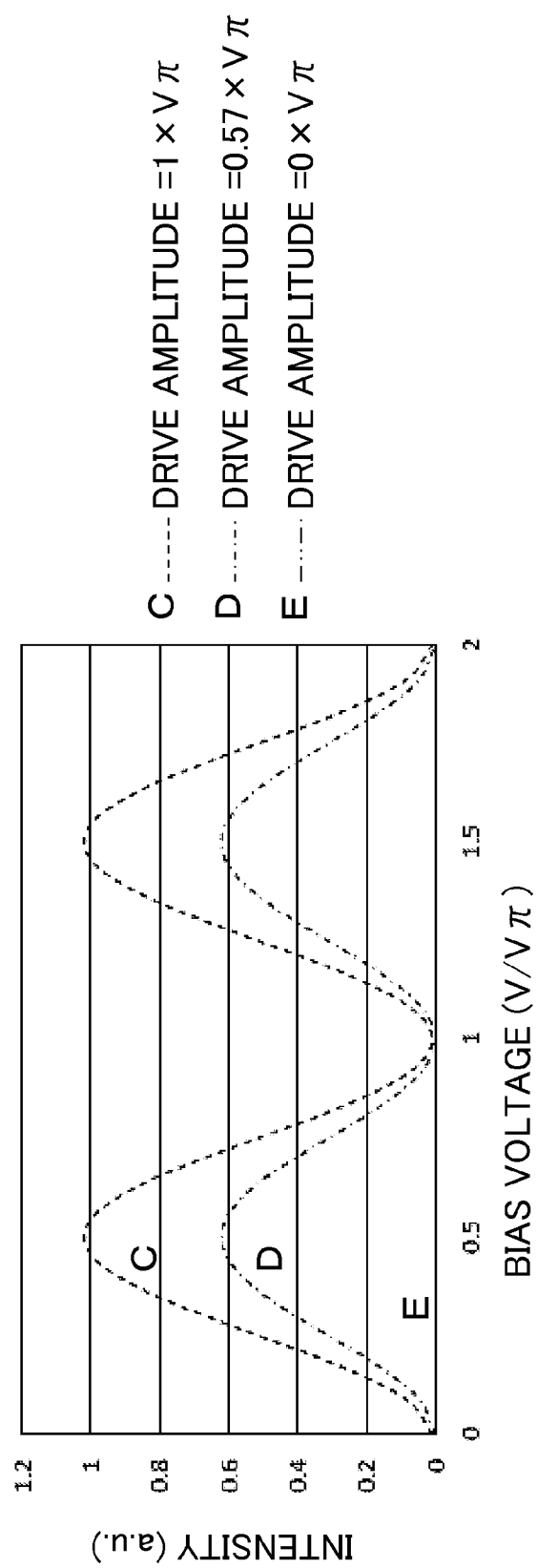

FIGS. 10 and 11 illustrate diagrams illustrating an exemplary relationship between changes of the light intensity AC component and the drive amplitude calculated by using the drive amplitude as a parameter. FIG. 10 illustrates relationships (characteristics A to C) when the drive amplitude V is V=2×Vπ, 1.43×Vπ, and 1×Vπ, respectively. FIG. 11 illustrates relationships (characteristics C to E) when the drive amplitude V is V=1×Vπ, 0.57×Vπ, and 0×Vπ, respectively.

As illustrated in FIG. 10, the light intensity AC component increases as a decrease of the drive amplitude from V=2×Vπ and reaches the maximum value at the drive amplitude V=Vπ. As illustrated in FIG. 11, when the drive amplitude V is further decreased from Vπ, the light intensity AC component also decreases. This behavior is opposite to that of the average light intensity monitor illustrated in FIG. 6.

Figure 12B:
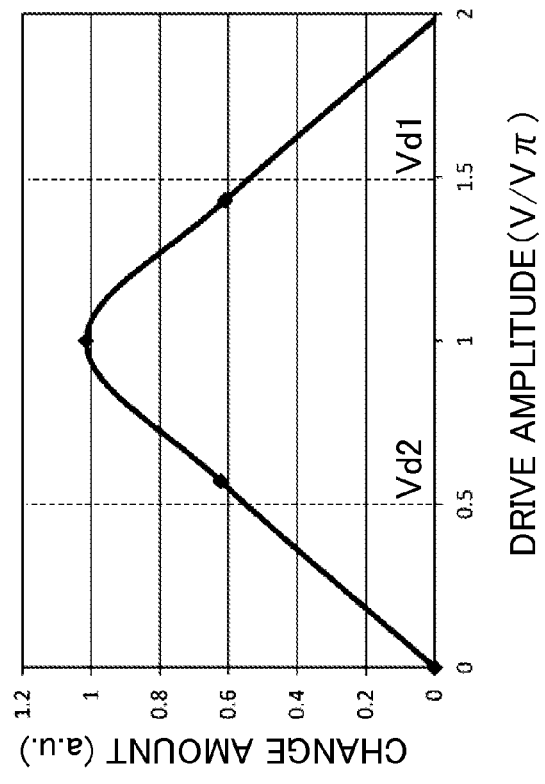
FIG. 12B is a diagram illustrating an exemplary relationship of the change amount with respect to the drive amplitude for a light intensity AC component monitor value.
Figure 12A:
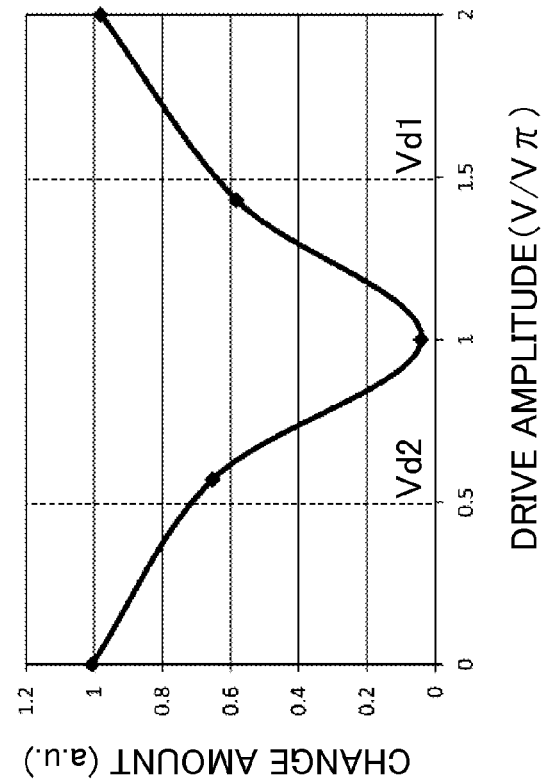
FIG. 12A is a diagram illustrating an exemplary relationship of a change amount with respect to the drive amplitude for an average light intensity monitor value.

FIG. 12A illustrates an exemplary relationship of a change amount to the drive amplitude of an average light intensity monitor value, and FIG. 12B illustrates an exemplary relationship of the change amount to the drive amplitude of a light intensity AC component monitor value.

As illustrated in FIG. 12A, the change amount (in other words, the detection sensitivity) becomes minimum when the drive amplitude is Vπ (see the characteristic C in FIG. 6) and it is difficult or practically impossible for the average light intensity monitor 91 to detect light intensity changes. In contrast, as illustrated in FIG. 12B, the change amount of the light intensity AC component conversely becomes maximum when the drive amplitude is Vπ.

From the above, when the drive amplitude is Vπ, by detecting a light intensity AC component by using the light intensity AC component monitor 92 instead of the average light intensity monitor 91, it becomes possible to detect changes of the light intensity AC component in accordance with a bias deviation. Therefore, it becomes possible to control the bias voltage.

In other words, a monitor sensitivity of the average light intensity and the light intensity AC component complementarily fluctuates with respect to the drive amplitude. Therefore, the average light intensity monitor 91 and the light intensity AC component monitor 92 are used mutually complementarily. Accordingly, it becomes possible to detect a bias deviation independent to the state of drive amplitude. Hence, it becomes possible to perform a bias control independent to the state of drive amplitude.

Next, the control by the bias controller 93 illustrated in FIG. 2 will be described with reference to the flow chart illustrated in FIG. 13.

The bias controller 93 switches whether to use a detection result of the average light intensity monitor 91 or to use a detection result of the light intensity AC component monitor 92 for bias control based on the value of drive amplitude. Here, two voltage thresholds (hereinafter, simply referred to as the "thresholds") Vd1 and Vd2 are set for the drive amplitude Vd. Here, Vd1>Vπ>Vd2 applies.

As a non-restrictive example, Vd1=1.5×Vπ and Vd2=0.5×Vπ. In this case, the thresholds Vd1 and Vd2 are values respectively corresponding to 1.5 and 0.5 of the horizontal axis normalized with respect to Vπ in FIGS. 12A and 12B. The thresholds Vd1 and Vd2 are stored, for example, in a storage unit (not illustrated) such as a memory included in the controller 9B.

The bias controller 93 monitors (determines) whether the drive amplitude Vd satisfies Vd≥Vd1, Vd1>Vd and Vd≥Vd2 or satisfies Vd<Vd2 (processing P11 to P13).

When the drive amplitude Vd is Vd≥Vd1 (Yes in the processing P11), the bias controller 93 uses a detection result of the average light intensity monitor 91 to perform a bias control. The bias control based on the detection result of the average light intensity monitor 91 is an example of a first bias control. For example, the bias controller 93 controls the bias voltage provided to the bias control electrodes 85 and 86 (see FIG. 2) such that the detection result (in other words, the average output light intensity of the MZ optical modulator 8) of the average light intensity monitor 91 becomes maximum (processing P14).

When the drive amplitude Vd extends over Vπ, in other words, Vd1>Vd and Vd≥Vd2 is satisfied (No in the processing P11 and Yes in the processing P12), the bias controller 93 uses a detection result of the light intensity AC component monitor 92 to perform a bias control. The bias control based on the detection result of the light intensity AC component monitor 92 is an example of a second bias control. For example, the bias controller 93 controls the bias voltage provided to the bias control electrodes 85 and 86 such that the light intensity AC component becomes minimum (processing P15).

When the drive amplitude Vd is Vd2>Vd (No in the processing P11 and P12 and Yes in the processing P13), the bias controller 93 uses a detection result of the average light intensity monitor 91 to perform a bias control. As is evident from FIGS. 6 and 12A, the change inclination with respect to changes of the drive amplitude is reversed at Vπ. Therefore, the direction of the bias control is reversed when the drive amplitude Vd is Vd2>Vd compared with the case of Vd≥Vd1. For example, the bias controller 93 controls the bias voltage provided to the bias control electrodes 85 and 86 such that the detection result of the average light intensity monitor 91 becomes minimum (processing P16).

In the case of No in the processing P13, in other words, the drive amplitude Vd does not satisfy any of the three conditions, the bias controller 93 may continue to monitor the three conditions without performing a bias control. In this case, the bias controller 93 may perform error processing such as notifying an external device of error information.

As is evident from the above operation example, the controller 9B includes a function to select one of the first bias control based on the detection result of the average light intensity monitor 91 and the second bias control based on the detection result of the light intensity AC component monitor 92 in accordance with the drive amplitude. The "selection" may also be referred to as the "switching".

By using the average light intensity monitor 91 and the light intensity AC component monitor 92 mutually complementarily in this manner, it becomes possible to detect a bias deviation independently for the drive amplitude. Thus, it becomes possible to perform a bias control independent to the drive amplitude.

Therefore, even when the drive amplitude of the MZ optical modulator 8 is smaller than 2×Vπ due to a signal-processed transmission signal waveform, it is possible to optimize the bias voltage of the MZ optical modulator 8. As a result, the output light intensity of the MZ optical modulator 8 can be adjusted so as to be maximum, and therefore, performance (for example, quality of transmission signal light) of the optical transmitter 11 can be improved.

EXAMPLE 1

Figure 14:
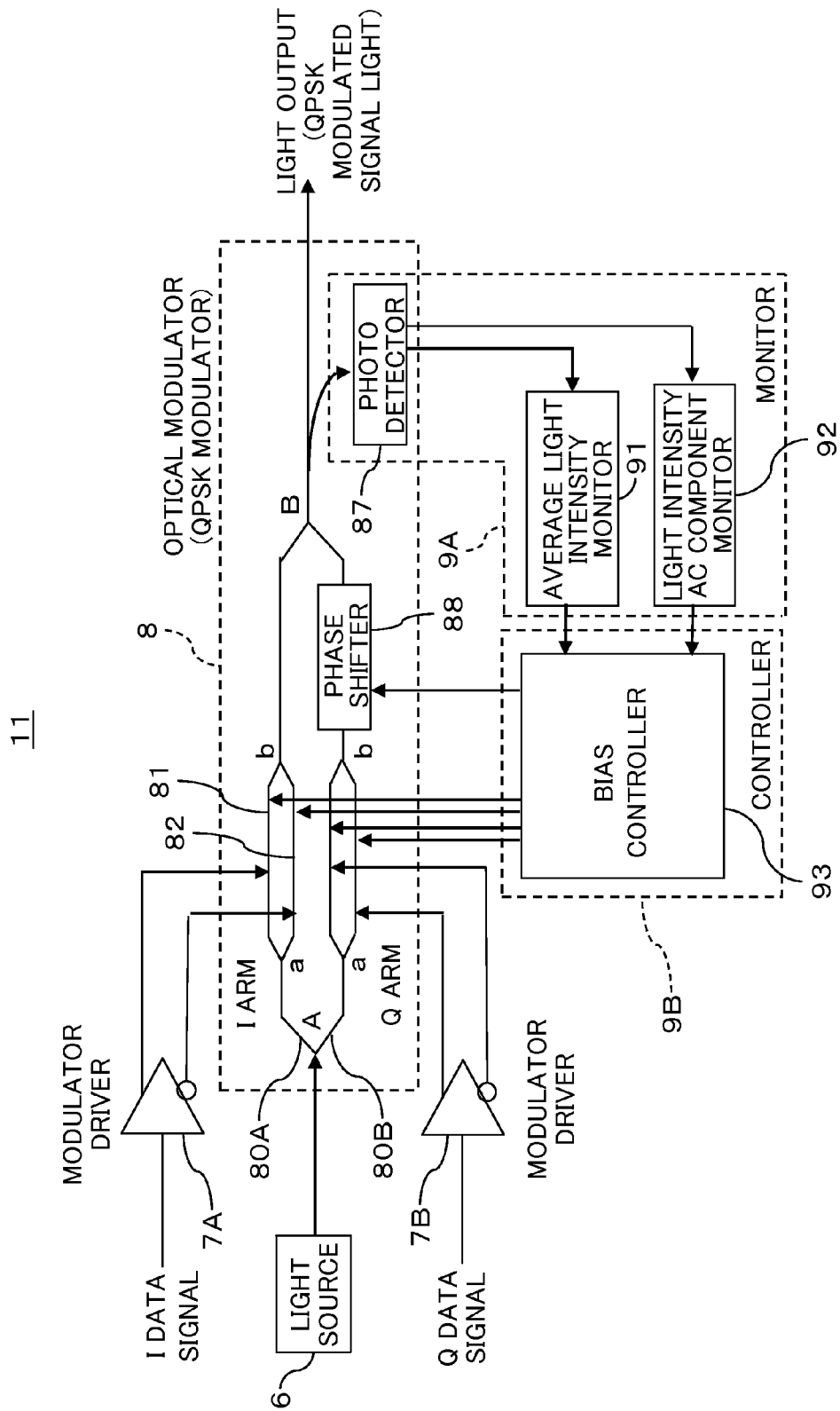
FIG. 14 is a block diagram illustrating an exemplary configuration of an optical transmitter according to Example 1.

FIG. 14 is a block diagram illustrating an exemplary configuration of the optical transmitter 11 according to Example 1. The optical transmitter 11 depicted in FIG. 14 is a QPSK (quadrature phase shift keying) optical transmitter, for example. Thus, the optical transmitter 11 includes an LN modulator (hereinafter, may also be referred to as a "QPSK modulator") containing optical waveguides 80A and 80B which forms an I arm and a Q arm, respectively, as the MZ optical modulator 8. In FIG. 14, unless otherwise noted, portions to which the same reference sign as the aforementioned reference sign are attached represent the same portion as the aforementioned portion or a similar portion.

In the QPSK modulator 8 illustrated in FIG. 14, point A indicates a branch point of the I arm 80A and the Q arm 80B and point B indicates a confluence of the I arm 80A and the Q arm 80B. For example, an optical splitter is applicable to the branch point A. Meanwhile, an optical combiner is applicable to the confluence B, for example.

Transmission light (continuum) output from the light source 6 is branched at the branch point A into two lights and the branched lights are introduced into the I arm 80A and the Q arm 80B, respectively. The transmission lights having propagated through each of the I arm 80A and the Q arm 80B are joined at the confluence B and are output from the confluence B.

As illustrated in FIG. 2, the two optical waveguides 81 and 82 branched at the branch point a and joined at the confluence b are provided for the I arm 80A and the Q arm 80B, respectively. For example, an optical splitter is applicable to the branch point a. Meanwhile, an optical combiner is applicable to the confluence b. The drive electrodes 83 and 84 and the bias control electrodes 85 and 86 illustrated in FIG. 2 are provided for the optical waveguides 81 and 82, respectively, but the illustration thereof is omitted in FIG. 14.

The continuous wave light propagated through the I arm 80A is modulated in accordance with an I data signal by providing a drive signal generated by a modulator driver 7A based on the I data signal to the drive electrodes 83 and 84. Thus, in the I arm 80A, I arm modulated signal light is generated by modulating the continuous wave light with the I data signal.

Similarly, the continuous wave light propagated through the Q arm 80B is modulated in accordance with a Q data signal by providing a drive signal generated by a modulator driver 7B based on the Q data signal to the drive electrodes 83 and 84. Thus, in the Q arm 80B, Q arm modulated signal light is generated by modulating the continuous wave light with the Q data signal.

In other words, the optical waveguides 81 and 82 that form the I arm 80A is an example of a first modulator operable to generate the I arm modulated signal light. Meanwhile, the optical waveguides 81 and 82 that form the Q arm 80B is an example of a second modulator operable to generate the Q arm modulated signal light. Hereinafter, for the sake of convenience, the I arm 80A may be represented as a first modulator 80A and the Q arm 80B may be represented as a second modulator 80B.

An I data signal and a Q data signal correspond to an in-phase component (I) and a quadrature component (Q) in a complex plane (IQ plane) of a transmission data signal, respectively, and are generated by the signal processing circuit 4, for example.

Further, a phase shifter 88 may be provided at a rear stage of the confluence b for one of the I arm 80A and the Q arm 80B (for the Q arm 80B in the example of FIG. 14). The phase shifter 88 provides a phase difference of $\pi/2$ to the lights that propagates through the I arm 80A and the Q arm 80B, in other words, to the I arm modulated signal light and the Q arm modulated signal light. The bias controller 93 may control (or adjust) the phase difference provided by the phase shifter 88.

The I arm modulated signal light and the Q arm modulated signal light having a phase difference of $\pi/2$ are joined at the confluence B provided with the optical combiner. A QPSK modulated light signal is thereby generated.

In the QPSK modulator 8 as described above, targets of the bias control by the bias controller 93 may include the bias control electrodes 85 and 86 provided for each of the I arm 80A and the Q arm 80B, and the phase shifter 88.

Figure 15:
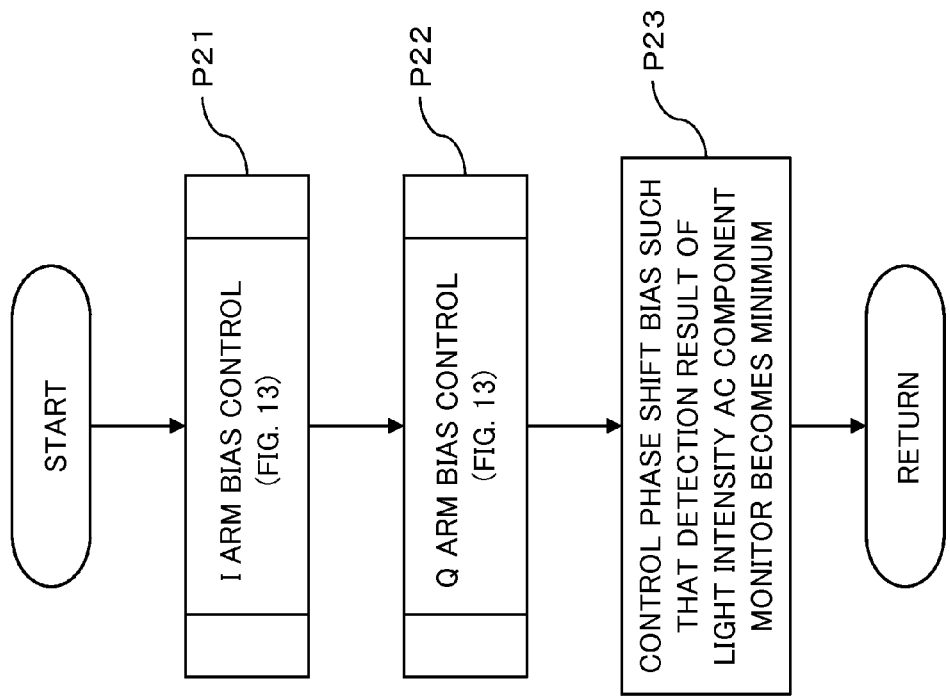
FIG. 15 is a flow chart illustrating an exemplary bias control performed by a bias controller illustrated in FIG. 14.

The bias controller 93 according to Example 1 may perform, as illustrated in FIG. 15, a bias control (processing P21) of the first modulator 80A, a bias control (processing P22) of the second modulator 80B, and a bias control (processing P23) of the phase shifter 88, sequentially (or time-divisionally) and repeatedly. The order of the processing P21 to P23 may be exchanged each other.

Figure 13:
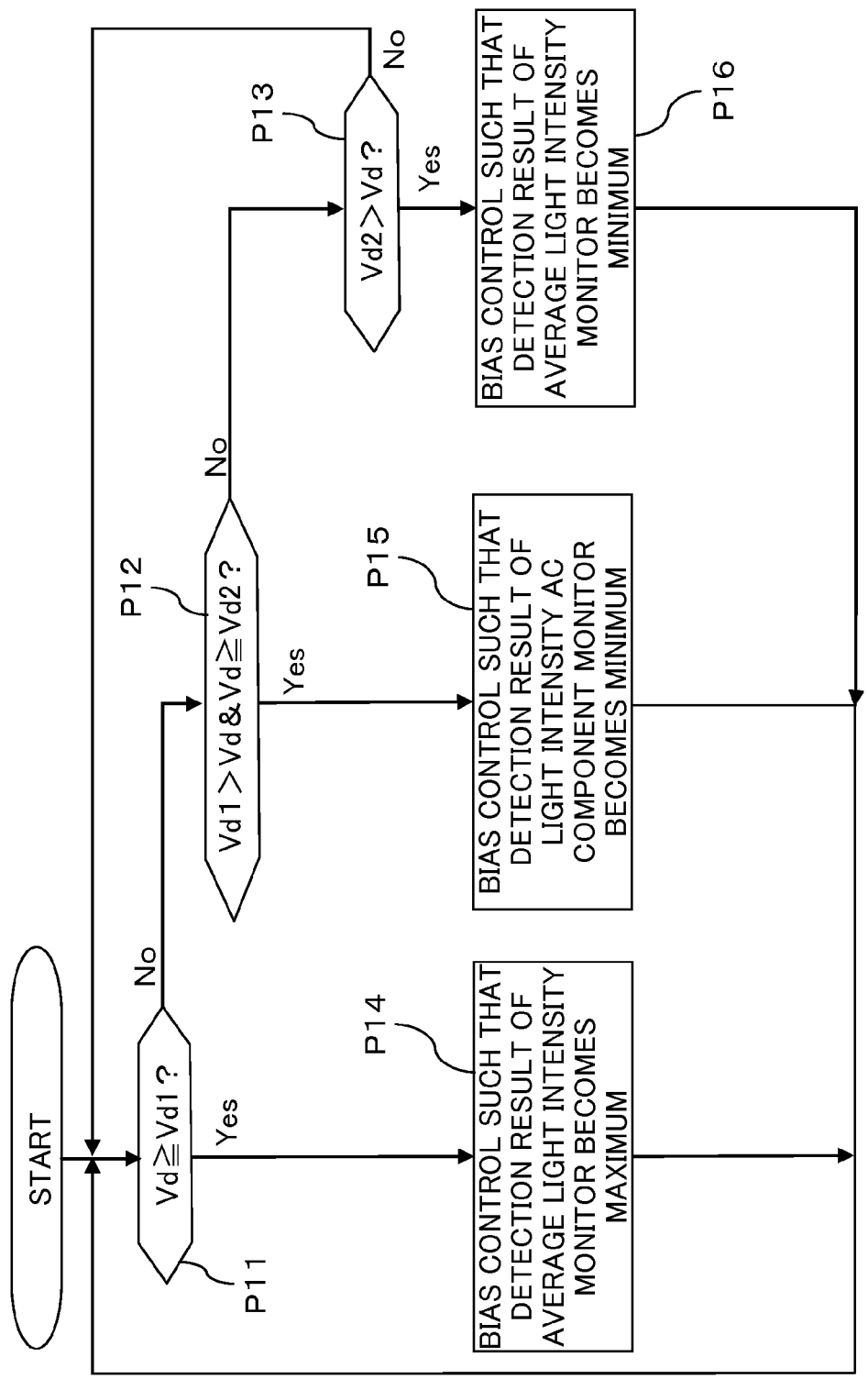
FIG. 13 is a flow chart illustrating an example of bias control performed by a bias controller illustrated in FIG. 2.

In the bias control of each processing P21 and P22, the processing P11 to P16 illustrated in FIG. 13 may be performed. For example, the bias controller 93 is operable to determine whether the drive amplitude Vd satisfies Vd≥Vd1, or satisfies Vd1>Vd and Vd≥Vd2, or satisfies Vd<Vd2 for each of the I arm 80A and the Q arm 80B (processing P11 to P13). Then, the bias controller 93 may perform the bias control illustrated in FIG. 13 by selectively using a detection result of the average light intensity monitor 91 or the light intensity AC component monitor 92 in accordance with the determination result (processing P14 to P16).

In the bias control of the phase shifter 88 in the processing P23, since a control may be performed such that I arm modulated signal light and Q arm modulated signal light become equal, a detection result of the light intensity AC component monitor 92 may be used to perform the control. For example, the bias controller 93 may control a bias of the phase shifter 88 such that the detection result of the light intensity AC component monitor 92 becomes minimum.

In the above example, the bias control of the first and second modulators 80A and 80B is time-divisionally performed but may also be performed in parallel. The parallel control can be realized by providing the optical detector 87 and each of the monitors 91 and 92 for each of the I arm modulated signal light and the Q arm modulated signal light. This is also applicable to Examples 2 to 4 set out below.

EXAMPLE 2

Figure 16:
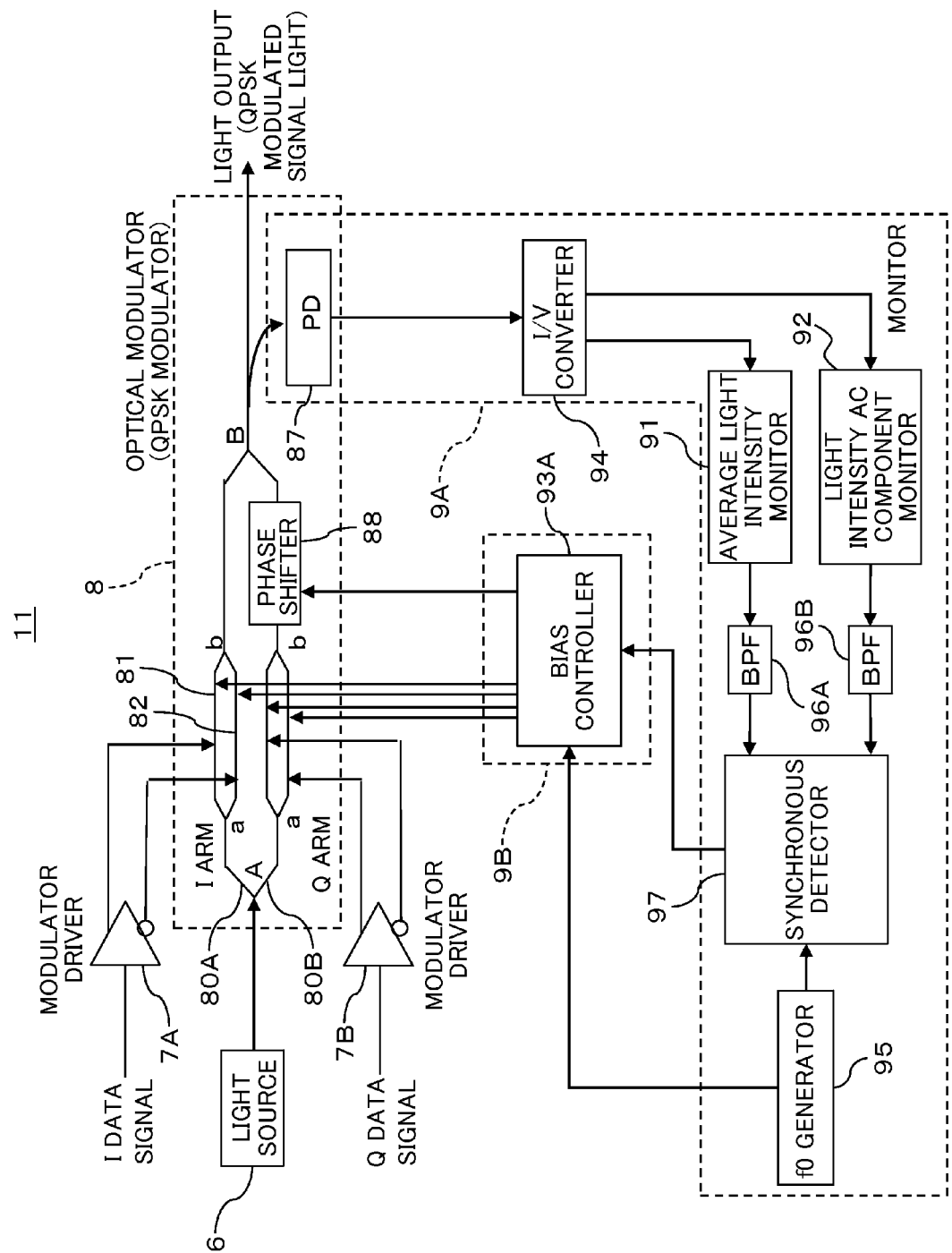
FIG. 16 is a block diagram illustrating an exemplary configuration of the optical transmitter according to Example 2.

FIG. 16 is a block diagram illustrating an exemplary configuration of the optical transmitter 11 according to Example 2. The optical transmitter 11 illustrated in FIG. 16 is, like in Example 1, a QPSK optical transmitter and includes a photodiode (PD) as an example of the optical detector 87 illustrated in FIG. 14.

The PD 87 receives light obtained by branching a part of output light from the QPSK modulator 8 and outputs an electric signal (for example, a current) in accordance with received light power. An optical branch such as an optical coupler may be applicable to branch a part of output light from the QPSK modulator 8. The illustration of the optical branch is omitted in FIG. 16.

The optical transmitter 11 illustrated in FIG. 16 is different from the configuration illustrated in FIG. 14 as an example of the monitor 9A in that an I/V converter 94, an f0 generator 95, band-pass filters (BPF) 96A and 96B, and a synchronous detector 97 are additionally included. Further, the optical transmitter 11 illustrated in FIG. 16 is different from the configuration illustrated in FIG. 14 in that, instead of the bias controller 93, a bias controller 93A is included as an example of the controller 9B.

In the monitor 9A, the I/V converter 94 is operable to convert a current output from the PD 87 into a voltage. A TIA is applicable to the I/V converter 94, for example. The voltage obtained by the conversion is input into both of the average light intensity monitor 91 and the light intensity AC component monitor 92.

The f0 generator 95 is an example of a low-frequency signal source operable to generate a low-frequency signal of a frequency f0. The generated low-frequency signal is input into the bias controller 93A and the synchronous detector 97. The low-frequency signal input into the bias controller 93A is superimposed on a drive signal of the QPSK modulator 8. Thus, the f0 generator 95 and the bias controller 93A may be considered as forming an example of a low-frequency superimposer. The low-frequency signal input into the synchronous detector 97 is used for a synchronous detection of a detection result detected by each of the monitors 91 and 92.

The BPF 96A is operable to remove signal components other than the f0 component from output of the average light intensity monitor 91 and to allow the f0 component to pass to the synchronous detector 97.

The BPF 96B removes signal components other than the f0 component from output of the light intensity AC component monitor 92 and allows the f0 component to be passed to the synchronous detector 97.

The synchronous detector 97 is operable to perform the synchronous detection of the low-frequency signal input from the f0 generator 95 and f0 components input from the BPF 96A and the BPF 96B. The average light intensity monitor 91 outputs an average value of detected light intensity and has a response speed operable to respond to a signal on which the f0 component is superimposed. Thus, the synchronous detection by the synchronous detector 97 is available. Meanwhile, in the light intensity AC component monitor 92, when the f0 component is superimposed, an AC component caused by a bias deviation changes in time in accordance with the f0 component. Thus, the synchronous detection in the synchronous detector 97 is also available.

The PD 87, the I/V converter 94, the f0 generator 95, the band-pass filters (BPF) 96A and 96B, and the synchronous detector 97 form an example of the monitor operable to detect (or monitor) an average value and an AC component of output light intensity of the optical modulator 8. The monitor may also be referred to as the "monitor system."

The bias controller 93A is operable to perform a bias control for each of the arms 80A and 80B of the QPSK modulator 8 and the phase shifter 88 by selectively using one of the f0 components which are indicative of detection results of the monitors 91 and 92 and are extracted by synchronous detection of the synchronous detector 97.

Figure 17:
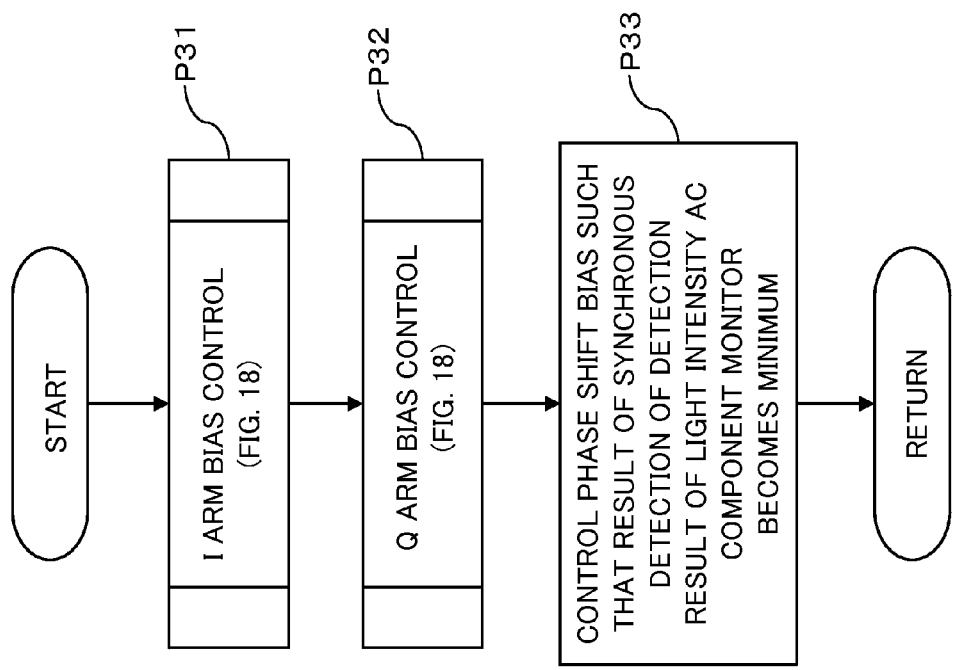
FIGS. 17 and 18 are flow charts illustrating an exemplary bias control performed by a bias controller illustrated in FIG. 16.

The bias controller 93A according to Example 2 may perform, as illustrated in FIG. 17, a bias control (processing P31) of the I arm 80A, a bias control (processing P32) of the Q arm 80B, and a bias control (processing P33) of the phase shifter 88 sequentially (or time-divisionally) and repeatedly. The order of the processing P31 to P33 may be exchanged each other.

Figure 18:
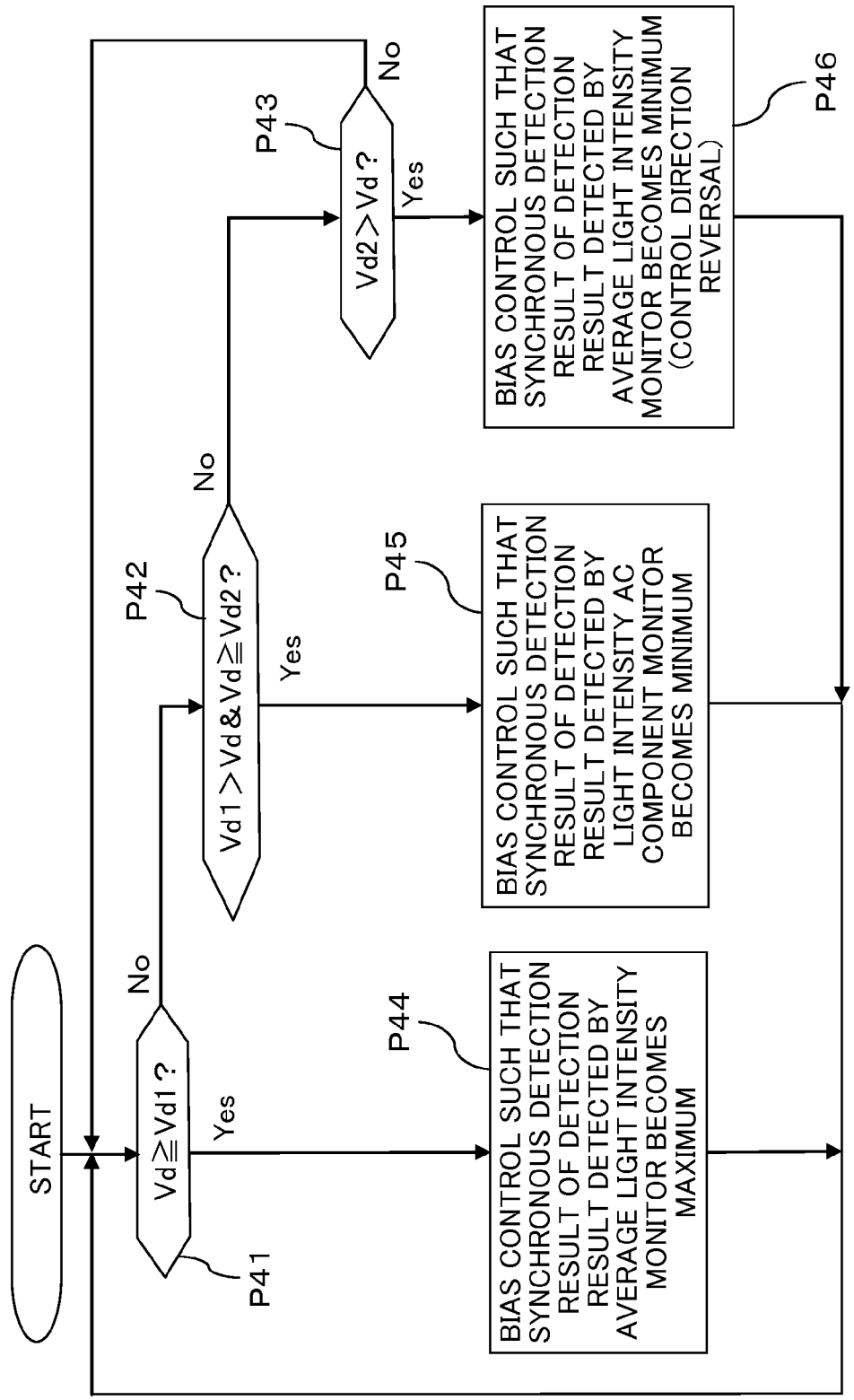

In the bias control of each processing P31 and P32, processing P41 to P46 illustrated in FIG. 18 may be performed. For example, the bias controller 93A is operable to determine whether the drive amplitude Vd satisfies Vd≥Vd1, or satisfies Vd1>Vd and Vd≥Vd2, or satisfies Vd<Vd2 for each of the I arm 80A and the Q arm 80B (processing P41 to P43).

When the drive amplitude Vd is Vd≥Vd1 (Yes in the processing P41), the bias controller 93A is operable to perform a bias control by using a synchronous detection result obtained by performing the synchronous detection on the detection result detected by the average light intensity monitor 91 at the synchronous detector 97. For example, the bias controller 93A is operable to control the bias voltage provided to the bias control electrodes 85 and 86 (see FIG. 2) such that the synchronous detection result becomes maximum (processing P44).

When the drive amplitude Vd extends over Vπ, in other words, Vd1>Vd and Vd≥Vd2 is satisfied (No in the processing P41 and Yes in the processing P42), the bias controller 93A is operable to perform a bias control by using a synchronous detection result obtained by performing the synchronous detection on the detection result detected by the light intensity AC component monitor 92 at the synchronous detector 97. For example, the bias controller 93A is operable to control the bias voltage provided to the bias control electrodes 85 and 86 such that the synchronous detection result becomes minimum (processing P45).

When the drive amplitude Vd is Vd2>Vd (No in the processing P41 and P42 and Yes in the processing P43), the bias controller 93A is operable to perform a bias control by using a synchronous detection result obtained by performing the synchronous detection on a detection result detected by the average light intensity monitor 91 at the synchronous detector 97 of.

As is evident from FIGS. 6 and 12A, like in Example 1, the change inclination with respect to changes of the drive amplitude is reversed at Vπ and so the direction of the bias control is reversed when the drive amplitude Vd is Vd2>Vd compared with the case of Vd≥Vd1. For example, the bias controller 93A is operable to control the bias voltage provided to the bias control electrodes 85 and 86 such that the synchronous detection result of the detection result detected by the average light intensity monitor 91 becomes minimum (processing P46).

In the case of No in the processing P43, in other words, the drive amplitude Vd does not satisfy any of the above three conditions, the bias controller 93A may continue to monitor the three conditions without performing a bias control. In this case, the bias controller 93 may perform error processing such as notifying an external device of error information.

In the processing P33 (bias control of the phase shifter 88) illustrated in FIG. 17, since a control may be performed such that I arm modulated signal light and Q arm modulated signal light become equal, a synchronous detection result obtained by performing the synchronous detection on a detection result detected by the light intensity AC component monitor 92 may be used to perform the control. For example, the bias controller 93 may control a bias of the phase shifter 88 such that the synchronous detection result obtained by performing the synchronous detection on the detection result detected by the light intensity AC component monitor 92 at the synchronous detector 97 becomes minimum.

According to Example 2, as described above, since the processing similar to the processing according to an embodiment described above or Example 1 is applicable to the QPSK modulator 8, the bias control of the QPSK modulator 8 can be optimized independently to the drive amplitude.

Also according to Example 2, since the detection results of the monitors 91 and 92 are filtered by the BPF 96A and the BPF 96B and subjected to the synchronous detection by the synchronous detector 97, a detection accuracy of the f0 component can be improved. Therefore, an accuracy of the bias control can be improved.

EXAMPLE 3

The initial bias state before performing a bias control of the MZ optical modulator 8 is unstable. Thus, when control is performed such that the AC component of output light intensity becomes minimum in FIGS. 10 and 11, the bias voltage Vd is controlled to Vπ in the case where the initial bias voltage Vd satisfies 0.5×Vπ<Vd<1.5×Vπ.

However, the bias voltage Vd may be controlled to 0×Vπ in the case where the initial bias voltage Vd satisfies Vd≤0.5×Vπ. Also, the bias voltage Vd may be controlled to 2×Vπ in the case where the initial bias voltage Vd is Vd≥1.5×Vπ

The bias voltage target corresponding to a convergent point of the bias control is Vπ, and thus, it is preferable to avoid an operation in which the bias voltage Vd converges to 0×Vπ or 2×Vπ. Example 3 is an example in which measures against such an operation are taken.

Figure 19:
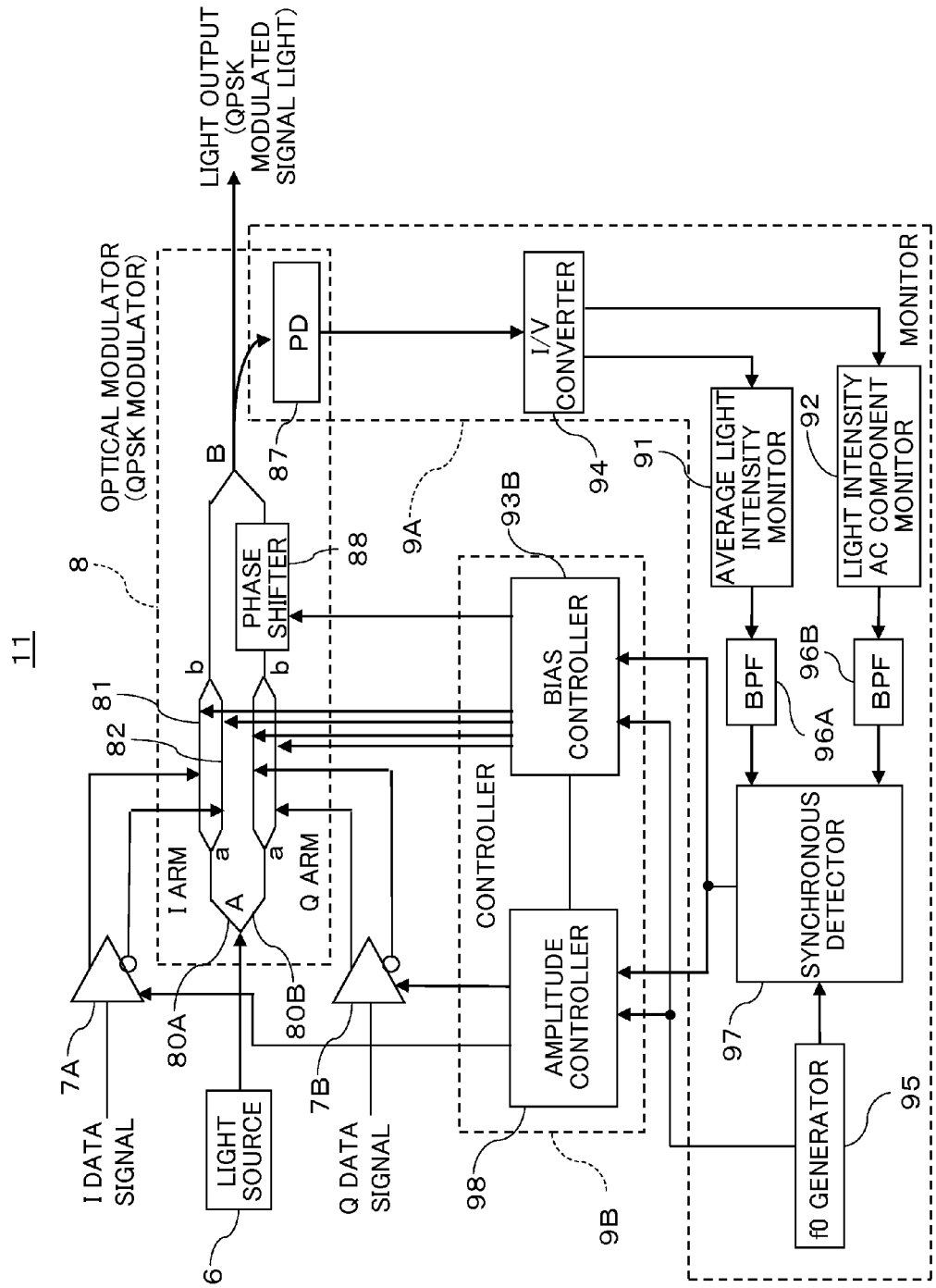
FIG. 19 is a block diagram illustrating an exemplary configuration of the optical transmitter according to Example 3.

FIG. 19 is a block diagram illustrating an exemplary configuration of the optical transmitter 11 according to Example 3. The optical transmitter 11 illustrated in FIG. 19 is, like in Examples 1 and 2, a QPSK optical transmitter and is different from the configuration illustrated in FIG. 16 in that a bias controller 93B and an amplitude controller 98 are included in the controller 9B.

The bias controller 93B may include the function of the aforementioned bias controller 93 or 93A and is operable to perform opposed phase determination processing described later in cooperation with the amplitude controller 98.

The amplitude controller 98 is operable to control output of the modulator drivers 7A and 7B in accordance with a low-frequency signal generated by the f0 generator 95 in response to a control from the bias controller 93B. Accordingly, the f0 component is superimposed on a drive signal provided to the I arm 80A and the Q arm 80B of the QPSK modulator 8.

Figure 20:
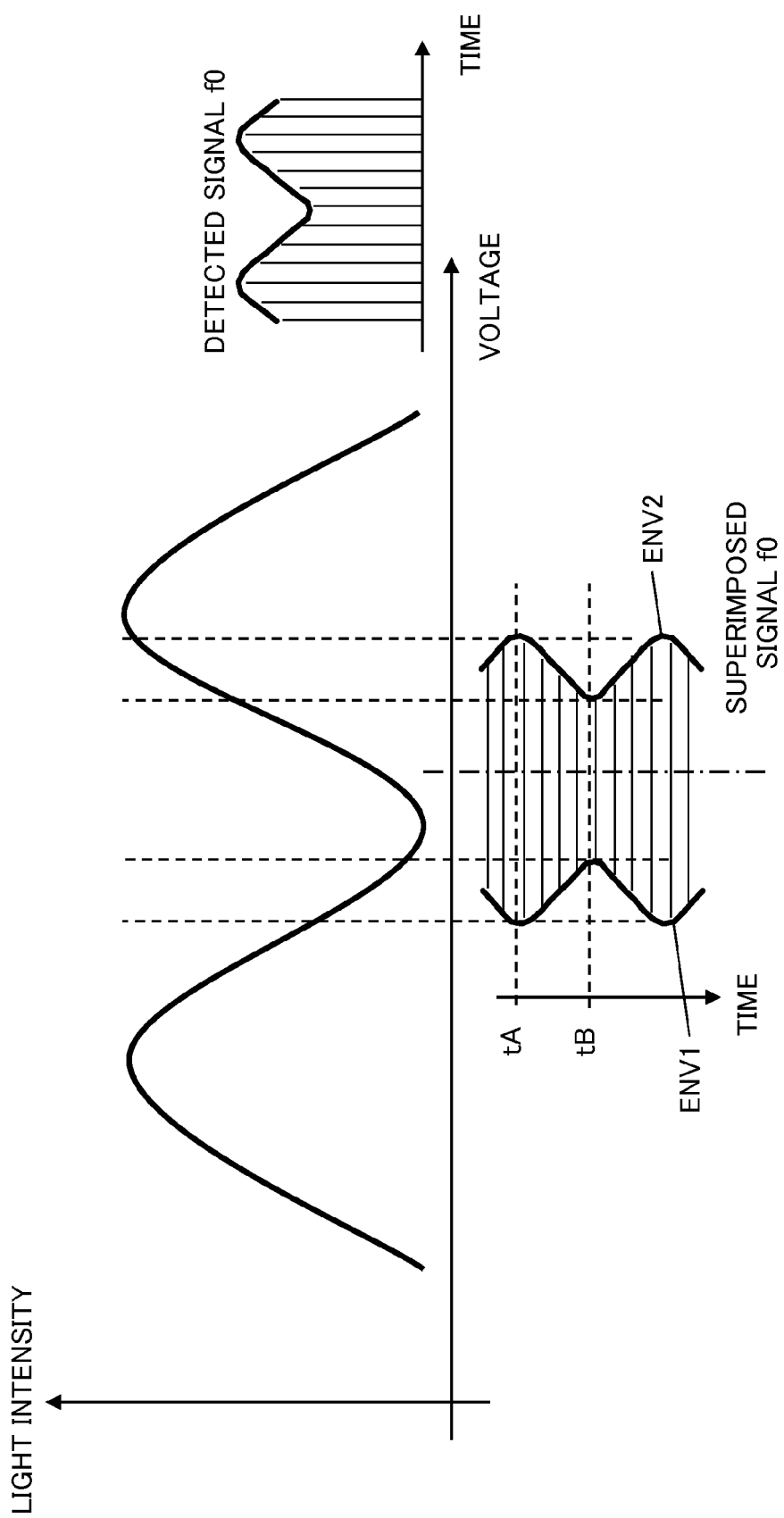
FIG. 20 is a diagram illustrating an exemplary changes in the output light intensity of the optical modulator when a low-frequency signal of a frequency f0 is superimposed on the drive amplitude of the optical modulator illustrated in FIG. 19 and when an initial bias voltage is near a bottom indicated in a drive voltage to output light intensity characteristic.
Figure 21:
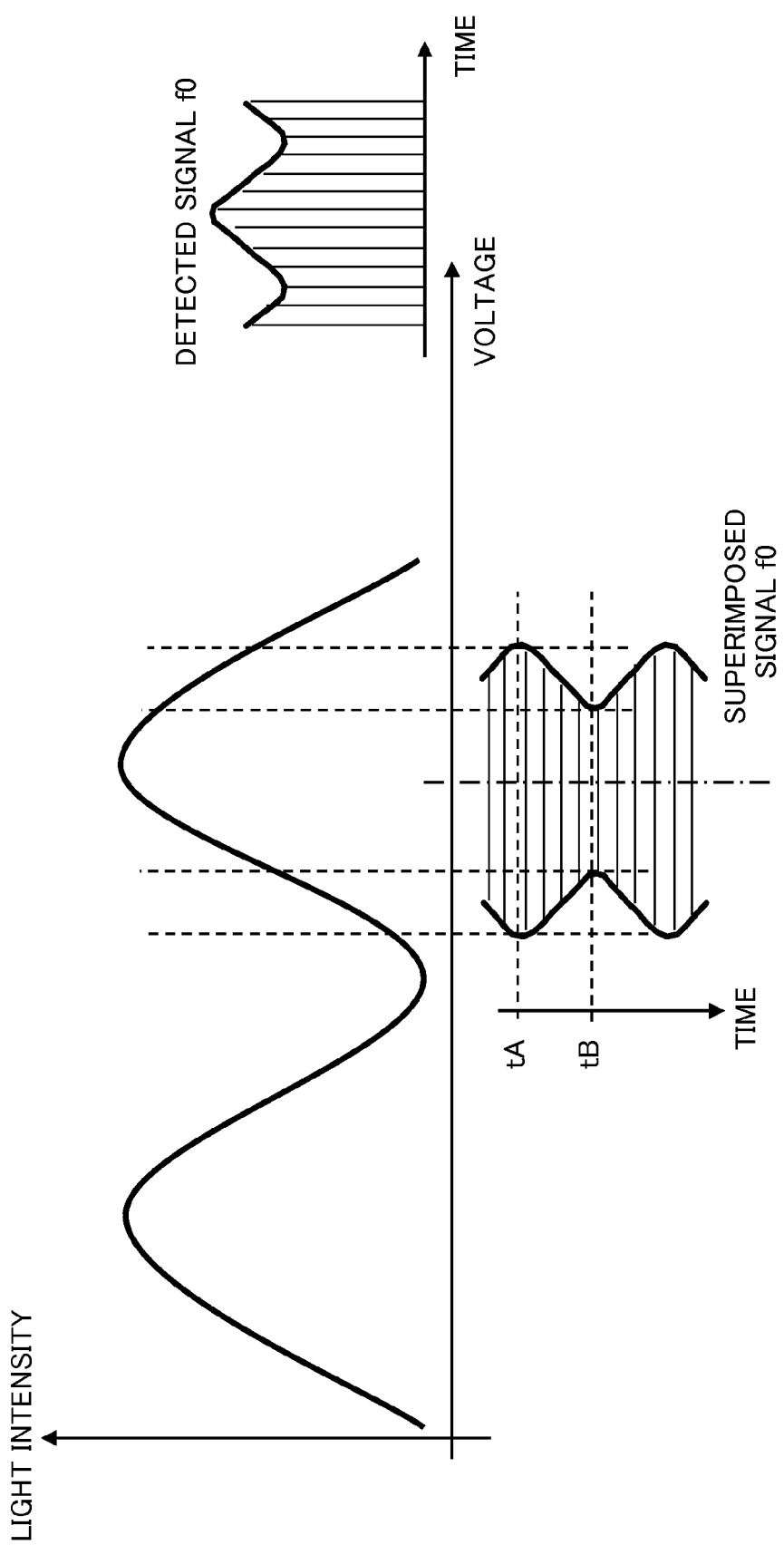
FIG. 21 is a diagram illustrating an exemplary changes in the output light intensity of the optical modulator when the low-frequency signal of the frequency f0 is superimposed on the drive amplitude of the optical modulator illustrated in FIG. 19 and when the initial bias voltage is near a peak indicated in the drive voltage to output light intensity characteristic.

The above operation will be further described in detail with reference to FIGS. 20 to 24. Since the initial bias voltage state is unstable, it is assumed that the initial bias voltage is near the bottom indicated in the drive voltage to output light intensity characteristic of the MZ optical modulator 8 as illustrated in FIG. 20, for example. Meanwhile, FIG. 21 illustrates a case where the initial bias voltage is near the peak of drive voltage to output light intensity characteristic of the MZ optical modulator 8. FIGS. 20 and 21 illustrate states of changes of output light intensity of the MZ optical modulator 8 when a low-frequency signal of the frequency f0 is superimposed on the drive amplitude.

In the case of FIG. 20, the f0 component is observed in an output light intensity signal of the MZ optical modulator 8 due to the superimposition of the low-frequency signal on the drive signal. When the drive amplitude increases as depicted at time tA, the output light intensity also increases, and when the drive amplitude decreases as depicted at subsequent time tB, the output light intensity also decreases. In other words, the low-frequency signal superimposed on the drive signal and the intensity changes of the detected output light signal are in an in-phase relationship.

In contrast, in the case of FIG. 21, when the drive amplitude increases as depicted at time tA, the output light intensity decreases, and when the drive amplitude decreases as depicted at subsequent time tB, the output light intensity increases. In other words, the low-frequency signal superimposed on the drive signal and the intensity changes of the detected output light signal are in a reversed phase relationship.

Figure 22:
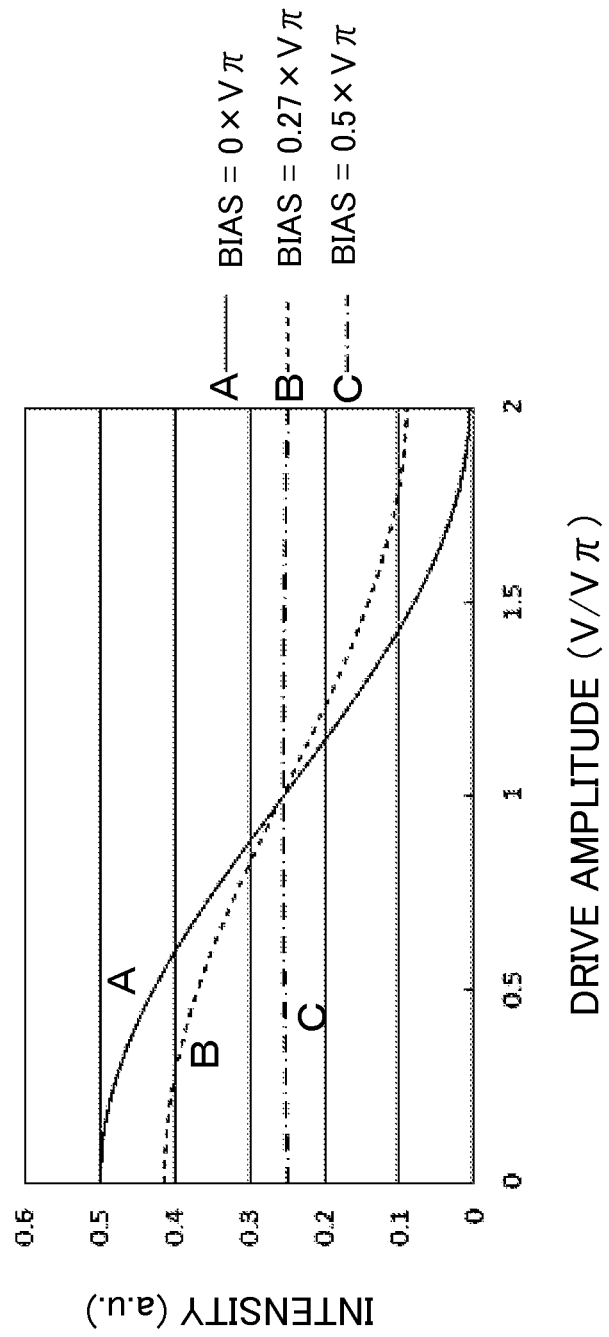
FIG. 22 is a diagram illustrating an exemplary relationship between the bias voltage and the output light intensity of the optical modulator illustrated in FIG. 19.

FIG. 22 top 24 illustrates the above relationships obtained by calculation. Graphs (or characteristics) A to C illustrated in FIG. 22 represent the relationship between the bias voltage and the output light intensity of the MZ optical modulator 8 when the bias voltage is set to 0×Vπ, 0.27×Vπ, and 0.5×Vπ, respectively.

Figure 23:
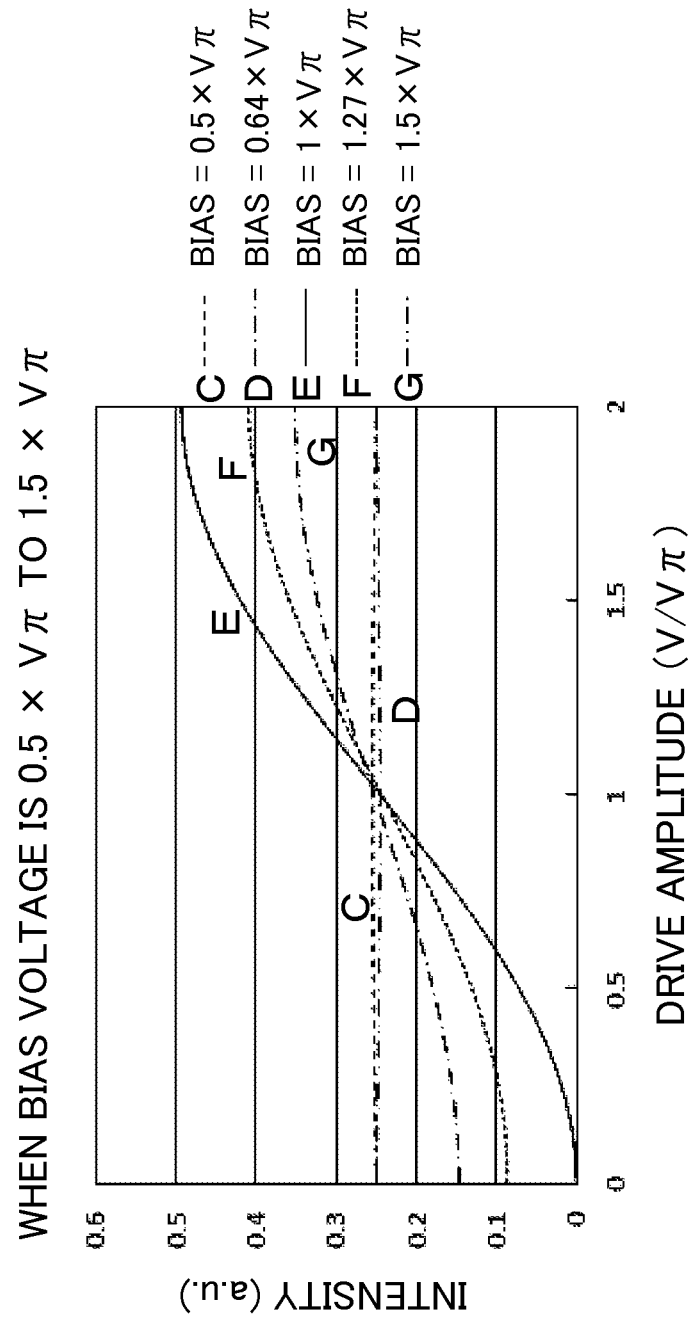
FIGS. 23 and 24 are diagrams illustrating an exemplary relationship between the bias voltage and the output light intensity of the optical modulator illustrated in FIG. 19.

Graphs (or characteristics) C to G illustrated in FIG. 23 represent the relationship between the bias voltage and the output light intensity of the MZ optical modulator 8 when the bias voltage is set to 0.5×Vπ, 0.64×Vπ, 1×Vπ, 1.27×Vπ, and 1.5×Vπ, respectively.

Figure 24:
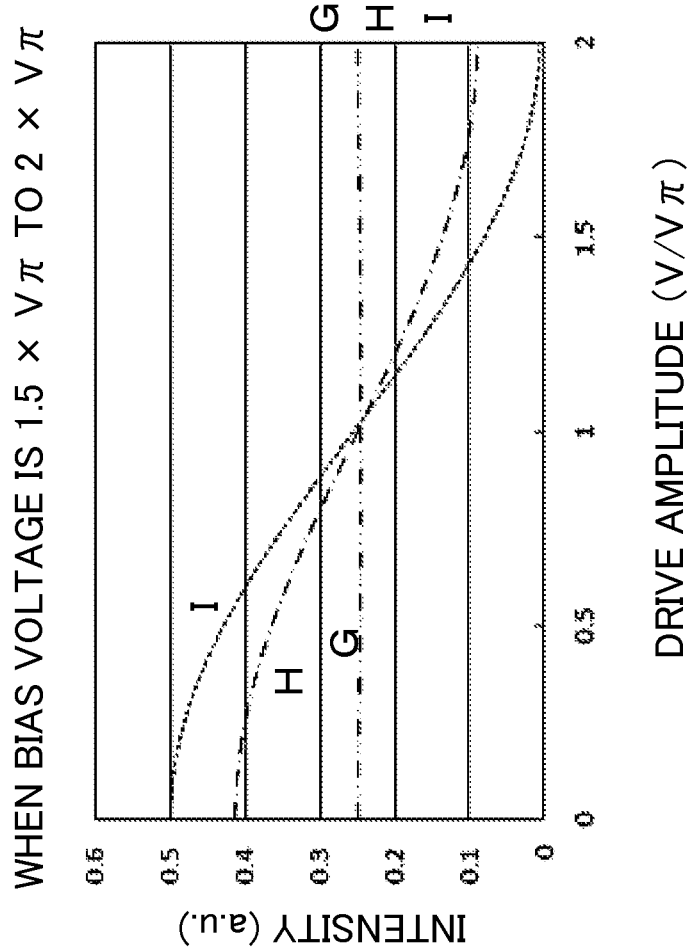

Graphs (or characteristics) G to I illustrated in FIG. 24 represent the relationship between the bias voltage and the output light intensity of the MZ optical modulator 8 when the bias voltage is set to 1.5×Vπ, 1.73×Vπ, and 2×Vπ, respectively. In FIGS. 22 to 24, the bias voltage (V) is normalized with respect to Vπ.

As illustrated in FIGS. 22 and 24, when the bias voltage is in a range of 0×Vπ to 0.5×Vπ (see graphs A to C) or when the bias voltage is in a range of 1.5×Vπ to 2×Vπ (see graphs G to I), the output light intensity decreases in response to an increase of the drive amplitude.

Meanwhile, as illustrated in FIG. 23, the bias voltage is in a range of 0.5×Vπ to 1.5×Vπ (see graphs C to G), the output light intensity increases in response to an increase of the drive amplitude. In other words, by performing the synchronous detection on the drive amplitude on which the low-frequency signal is superimposed, the output light intensity changes in the cases of FIGS. 22 and 24 are in phase, and the output light intensity changes in the case of FIG. 23 are in reversed phase.

By using the above relationships, it is possible to avoid an operation in which the bias voltage Vd converges to 0×Vπ or 2×Vπ. For example, in the case of FIGS. 22 and 24 (reversed phase), the bias controller 93B is operable to prevent the bias voltage from converging to 0×Vπ or 2×Vπ by adding a predetermined voltage (for example, Vπ) to the bias voltage to shift an initial control point of the bias voltage.

Figure 25:
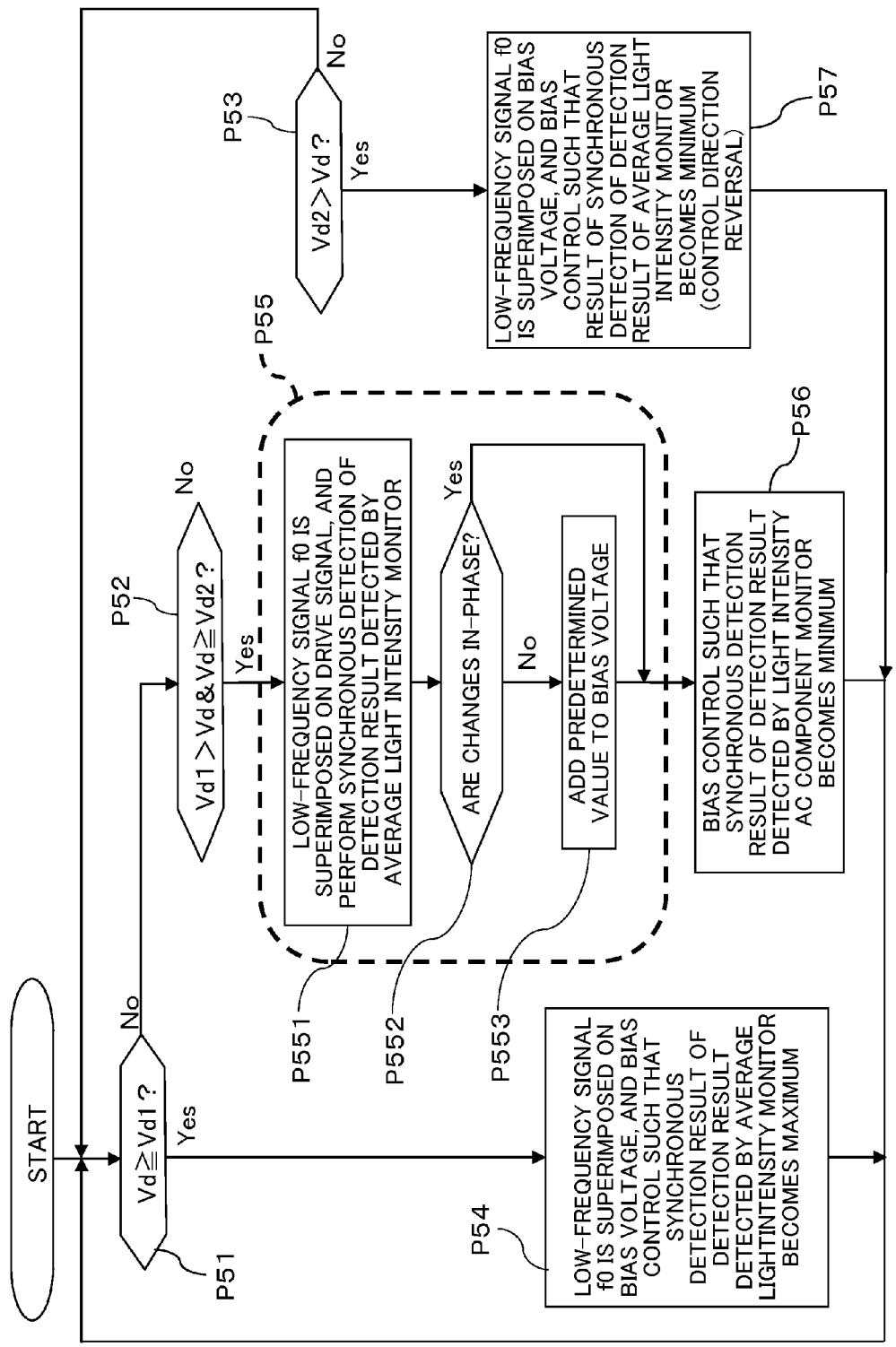
FIG. 25 is a flow chart illustrating an exemplary bias control performed by the bias controller illustrated in FIG. 19.

FIG. 25 illustrates an exemplary flow chart of the bias control performed by the bias controller 93B according to Example 3. Processing P55 indicated by a dotted line frame in FIG. 25 illustrates the aforementioned reversed phase determination processing. Processing P51 to P57 illustrated in FIG. 25 is performed for each of the I arm (first modulator) 80A and the Q arm (second modulator) 80B of the QPSK modulator 8. The order of performing processing is exchangeable.

As illustrated in FIG. 25, the bias controller 93B determines whether the drive amplitude Vd satisfies Vd≥Vd1, satisfies Vd1>Vd and Vd≥Vd2, or satisfies Vd<Vd2 for each of the first and second modulators 80A and 80B (processing P51 to P53).

When the drive amplitude Vd is Vd≥Vd1 (Yes in the processing P51), the bias controller 93B is operable to superimpose the low-frequency signal f0 on the bias voltage and to perform a bias control by using a synchronous detection result obtained by performing the synchronous detection on a detection result detected by the average light intensity monitor 91 at the synchronous detector 97. For example, the bias controller 93B is operable to control the bias voltage provided to the bias control electrodes 85 and 86 (see FIG. 2) such that the synchronous detection result becomes maximum (processing P54).

Meanwhile, when the drive amplitude Vd is Vd2>Vd (No in the processing P51 and P52 and Yes in the processing P53), the bias controller 93B is operable to superimpose the low-frequency signal f0 on the bias voltage and to perform exercise bias control by using a synchronous detection result obtained by performing the synchronous detection on a detection result detected by the average light intensity monitor 91.

As is evident from FIGS. 6 and 12A, like in Examples 1 and 2, since the change inclination with respect to changes of the drive amplitude is reversed at Vπ, the direction of the bias control is reversed when the drive amplitude Vd is Vd2>Vd compared with the case of Vd≥Vd1. For example, the bias controller 93B is operable to control the bias voltage provided to the bias control electrodes 85 and 86 such that the synchronous detection result obtained by performing the synchronous detection on the detection result detected by the average light intensity monitor 91 becomes minimum (processing P57).

Meanwhile, when the drive amplitude Vd extends over Vπ, in other words, Vd1>Vd and Vd≥Vd2 are satisfied, (No in the processing P51 and Yes in the processing P52), the bias controller 93B is operable to perform the reversed phase determination processing (processing P55). The reversed phase determination processing P55 may be performed before performing the bias control based on the detection result of the light intensity AC component monitor 92 and may include processing P551 to P553 set out below.

For example, the bias controller 93B is operable to cause the amplitude controller 98 to superimpose the low-frequency signal f0 on the drive signal and is operable to determine whether synchronous detection results obtained by performing synchronous detection on a detection result detected by the average light intensity monitor 91 at the synchronous detector 97 are in phase (processing P551 and P552).

When the detection results are in phase as a result of determination (Yes in the processing P552), the bias controller 93B is operable to perform a bias control by using a synchronous detection result obtained by performing a synchronous detection on a detection result detected by the light intensity AC component monitor 92 at the synchronous detector 97 (processing P56). For example, the bias controller 93B is operable to control the bias voltage provided to the bias control electrodes 85 and 86 such that the synchronous detection result becomes minimum.

Meanwhile, when the synchronous detection results are in opposed phase (No in the processing P552), the bias controller 93B is operable to add a predetermined voltage value (for example, Vπ) to the bias voltage (processing P553). Thereby, the initial control point is shifted such that the bias voltage Vd does not erroneously converge to 0×Vπ or 2×Vπ.

After the initial control point of the bias voltage is shifted, the bias controller 93B is operable to exercise a bias control by using a synchronous detection result obtained by performing a synchronous detection on a detection result detected by the light intensity AC component monitor 92 at the synchronous detector 97 (processing P56). For example, the bias controller 93B is operable to control the bias voltage provided to the bias control electrodes 85 and 86 such that the synchronous detection result becomes minimum.

In the case of No in the processing P53, in other words, the drive amplitude Vd does not satisfy any of the above three conditions, the bias controller 93B is operable to continue to monitor the three conditions without performing the bias control. In this case, the bias controller 93B may perform error processing such as notifying an external device of error information.

According to Example 3, as described above, it is possible to prevent the initial control point of the bias voltage from erroneously converging to 0×Vπ or 2×Vπ, in addition to technical advantageous effects similar to those of any of an embodiment described above and Examples 1 and 2. In other words, in response to a detection of a synchronous detection result indicative of the reversed phase of the f0 component according to the low-frequency (f0) signal superimposed on the drive signal, the initial control point of the bias voltage is shifted by adding a predetermined voltage to the bias voltage, and thus, it is possible to prevent the initial control point of the bias voltage from converging to an unintended voltage erroneously.

EXAMPLE 4

Figure 26:
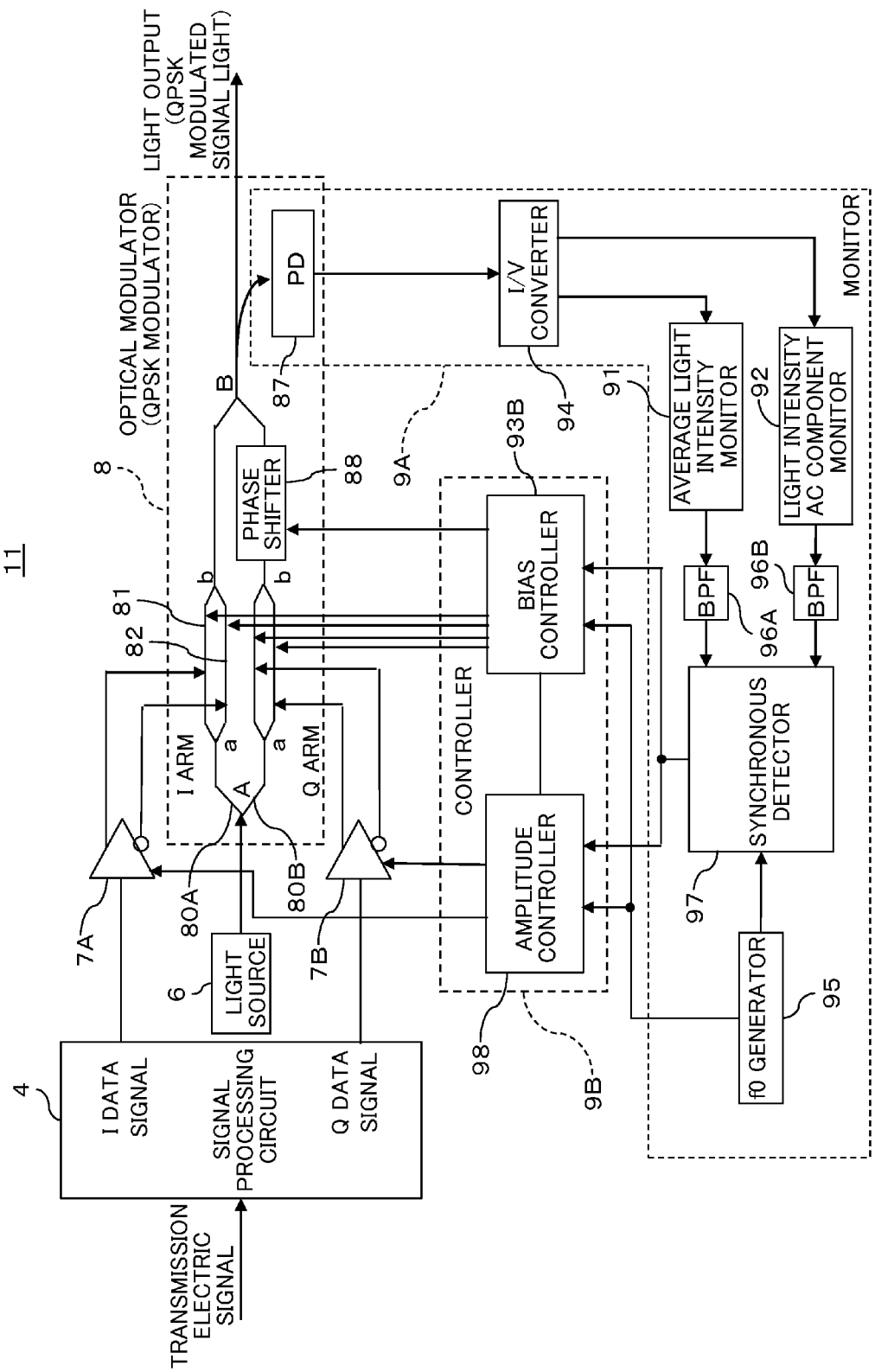
FIG. 26 is a block diagram illustrating an exemplary configuration of the optical transmitter according to Example 4.

FIG. 26 is a block diagram illustrating an exemplary configuration of the optical transmitter 11 according to Example 4. The optical transmitter 11 illustrated in FIG. 26 is, like in Examples 1 to 3, a QPSK optical transmitter and corresponds to a configuration in which the signal processing circuit 4 illustrated in FIG. 1 is additionally provided to the configuration illustrated in Example 3 (FIG. 19).

The signal processing circuit 4 is operable to perform digital signal processing of a transmission data signal which is an electric signal. The digital signal processing may include the Nyquist filtering. For example, the Nyquist filtering may filter the transmission data signal with a transfer function H(f) indicated by Formula 1 set out below. In Formula 1, f represents a frequency, α represents a so-called roll-off rate and takes a value within a range from 0 to 1. fn represents a parameter corresponding to a filtering band.

$$H(f) = \begin{cases} 1: & 0 \leq f \leq (1-\alpha)f_n \\ \frac{1}{2}\left\{1 - \sin\frac{\pi}{2\alpha}\left[\frac{f}{f_n} - (1-\alpha)\right]\right\}: & (1-\alpha)f_n \leq f \leq (1+\alpha)f_n \\ 0: & f \geq (1+\alpha)f_n \end{cases} \quad \text{[Formula 1]}$$

By performing the Nyquist filtering on the transmission data signal, it is possible to narrow an optical signal spectral shape in a frequency domain to thereby improve the frequency usage efficiency in wavelength multiplexing (WDM) optical transmission.

Figure 27A:
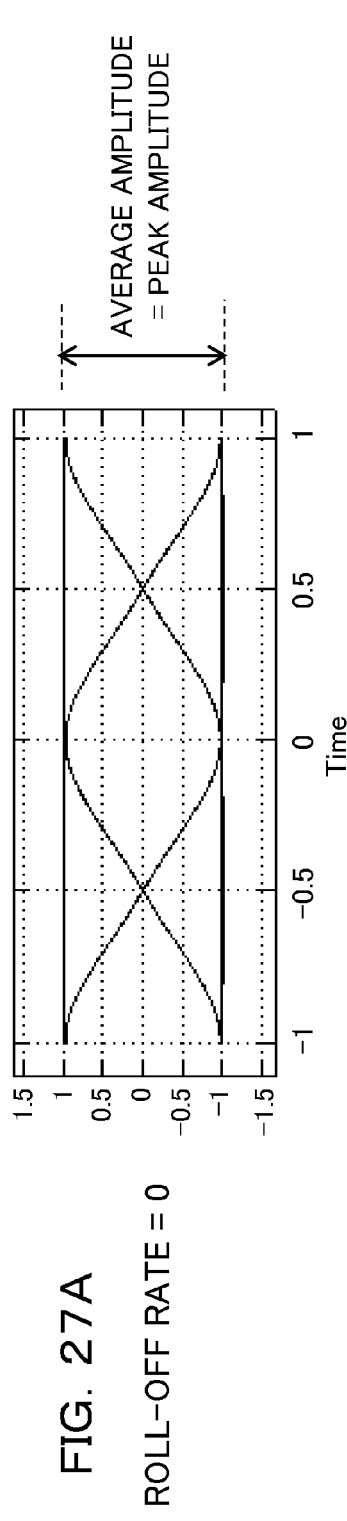
FIGS. 27A to 27C are diagrams respectively illustrating eye patterns of the drive signal of the optical modulator illustrated in FIG. 26 when a roll-off rate α is α=0, α=0.5, and α=1.
Figure 27B:
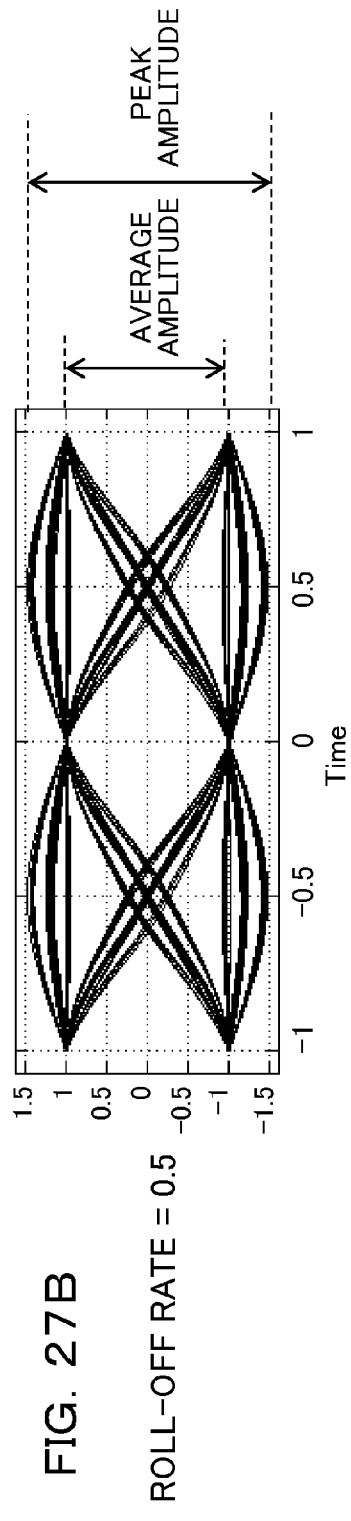
Figure 27C:
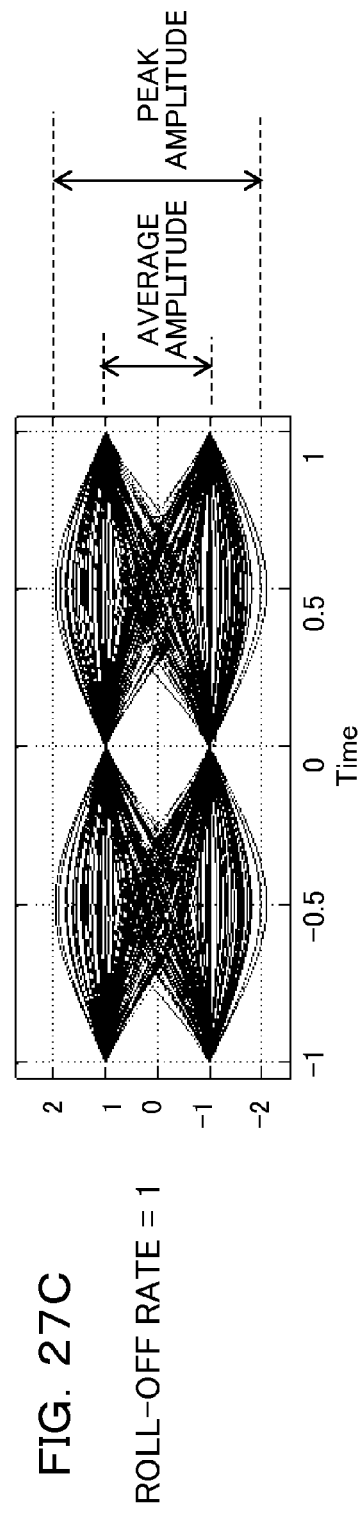

With the Nyquist filtering, the optical signal spectral shape can be made narrower with an increasing roll-off rate that determines a shape of the Nyquist filtering. In such a case, a transmission signal waveform also changes. FIGS. 27A to 27C illustrates exemplary eye patterns of a drive signal. FIGS. 27A to 27C illustrate eye patterns when the roll-off rate α is α=0, α=0.5, and α=1.

As is evident from FIGS. 27A to 27C, the peak drive amplitude with respect to the average drive amplitude increases with an increasing roll-off rate α. To enable transmission by light conversion up to a peak portion in this case, the amplitude of the average drive signal is set to an amplitude smaller than 2×Vπ.

As is evident from FIGS. 27A to 27C, the value of the average drive amplitude is determined according to the roll-off rate α. Thus, when the value thereof is Vd, the bias controller 93B is available to perform a bias control according to, for example, the flow chart illustrated in FIG. 25.

Therefore, according to Example 4, it is possible to perform an appropriate bias control on a transmission signal waveform which is subjected to digital signal processing by the signal processing circuit 4, in addition to technical advantageous effects similar to those of any of an embodiment described above and Examples 1 to 3 are obtained and further.

The Nyquist filtering may also be applied to an embodiment described above and Examples 1 and 2. In such a case, the bias control may be performed according to the corresponding flow chart among the flow charts illustrated in FIGS. 13, 15, and 17 (or 18).

According to the above technology, it is possible to perform a bias control independent to the amplitude of a driver signal of an optical modulator.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, alterations could be made hereto without departing from the spirit and scope of the invention.

What is claimed is:

1. An optical transmitter comprising:
    an optical modulator configured to modulate light output from a light source with a drive signal to output the modulated light;
    a monitor configured to detect an average value and an alternating-current (AC) component of output light intensity of the optical modulator; and
    a controller configured to select one of a first bias control and a second bias control in accordance with an amplitude of the drive signal, the first bias control controlling a bias voltage of the drive signal based on the average value, and the second bias control controlling the bias voltage of the drive signal based on the AC component, wherein
    the first bias control controls a bias of the drive signal such that the average value becomes maximum or minimum, and
    the second bias control controls a bias of the drive signal such that the AC component becomes minimum.

2. The optical transmitter according to claim 1, wherein the monitor comprises:
    a photo detector configured to receive output light of the optical modulator and to output an electric signal in accordance with received light intensity thereof;
    a first monitor configured to detect the average value based on the electric signal from the photo detector; and
    a second monitor configured to detect the AC component based on the electric signal from the photo detector.

3. The optical transmitter according to claim 1, wherein the controller is configured to:
    select the first bias control when an amplitude Vd of the drive signal is equal to or more than a first voltage threshold Vd1 larger than a half wavelength voltage $V\pi$ of the modulator or when the amplitude Vd is less than a second voltage threshold Vd2 smaller than the half wavelength voltage $V\pi$; and
    select the second bias control when the amplitude Vd satisfies Vd1>Vd≥Vd2.

4. The optical transmitter according to claim 3, wherein the first bias control comprises:
    processing to control the bias of the drive signal such that the average value becomes maximum when the amplitude Vd satisfies Vd≥Vd1; and
    processing to control the bias of the drive signal such that the average value becomes minimum when the amplitude Vd satisfies Vd<Vd2.

5. The optical transmitter according to claim 3, wherein the second bias control comprises processing to control the bias of the drive signal such that the AC component becomes minimum.

6. The optical transmitter according to claim 1, wherein
    the controller comprises a low-frequency superimposer configured to superimpose a low-frequency signal having a frequency lower than the frequency of the drive signal on the bias voltage,
    the monitor comprises a synchronous detector configured to detect a component of the low-frequency signal contained in output light of the optical modulator by using a synchronous detection based on the low-frequency signal, and
    the average value and the AC component are detected from the component of the low-frequency signal obtained by the synchronous detection.

7. The optical transmitter according to claim 1, wherein
    the controller comprises an amplitude controller configured to superimpose a low-frequency signal having a frequency lower than the frequency of the drive signal on the amplitude of the drive signal,
    the monitor comprises a synchronous detector configured to detect a component of the low-frequency signal superimposed in output light of the optical modulator by using a synchronous detection based on the low-frequency signal, and
    the controller is configured to add a predetermined voltage value to the bias voltage in the second bias control when a synchronous detection result of the synchronous detector indicates a reversed phase relationship between the low-frequency signal and intensity changes of the output light of the optical modulator.

8. The optical transmitter according to claim 1, wherein the drive signal is generated by performing digital signal processing on a transmission data signal and the amplitude of the drive signal is a variable amplitude varied in accordance with a signal waveform of the transmission data signal being subjected to the digital signal processing.

9. The optical transmitter according to claim 1, wherein the optical modulator comprises:
    a first modulator configured to modulate one of branched lights obtained by branching the light from the light source with the drive signal generated in response to an in-phase component of a transmission data signal; and
    a second modulator configured to modulate the other light of the branched lights with the drive signal generated in response to an orthogonal component of the transmission data signal, and
    the controller performs the selection of the first bias control and the second bias control for each of the first and second modulators.

10. A control apparatus of an optical modulator that modulates output light from a light source with a drive signal to output the modulated light, the control apparatus comprising:
    a monitor configured to detect an average value and an alternating-current (AC) component of output light intensity of the optical modulator; and
    a controller configured to select one of a first bias control and a second bias control in accordance with an amplitude of the drive signal, the first bias control controlling a bias voltage of the drive signal based on the average value, and the second bias control controlling the bias voltage of the drive signal based on the AC component, wherein the first bias control controls a bias of the drive signal such that the average value becomes maximum or minimum, and the second bias control controls a bias of the drive signal such that the AC component becomes minimum.

11. An optical transmitter comprising:

an optical modulator configured to modulate light output from a light source with a drive signal to output the modulated light;

a monitor configured to detect an average value and an alternating-current (AC) component of output light intensity of the optical modulator; and a controller configured to select one of a first bias control and a second bias control in accordance with an amplitude of the drive signal, the first bias control controlling a bias voltage of the drive signal based on the average value, and the second bias control controlling the bias voltage of the drive signal based on the AC component, wherein the controller is configured to:

select the first bias control when an amplitude $Vd$ of the drive signal is equal to or more than a first voltage threshold $Vd1$ larger than a half wavelength voltage $V\pi$ of the modulator or when the amplitude $Vd$ is less than a second voltage threshold $Vd2$ smaller than the half wavelength voltage $V\pi$; and select the second bias control when the amplitude $Vd$ satisfies $Vd1 > Vd \geq Vd2$.

12. The optical transmitter according to claim 11, wherein the first bias control comprises:

processing to control a bias of the drive signal such that the average value becomes maximum when the amplitude $Vd$ satisfies $Vd \geq Vd1$; and processing to control the bias of the drive signal such that the average value becomes minimum when the amplitude $Vd$ satisfies $Vd < Vd2$.

13. The optical transmitter according to claim 11, wherein the second bias control comprises processing to control a bias of the drive signal such that the AC component becomes minimum.

* * * * *